(12) United States Patent
Yoshimura et al.

(10) Patent No.: US 8,985,782 B2
(45) Date of Patent: Mar. 24, 2015

(54) PROJECTOR AND METHOD FOR CONTROLLING PROJECTOR

(71) Applicant: Seiko Epson Corporation, Tokyo (JP)

(72) Inventors: Jun Yoshimura, Shiojiri (JP); Makoto Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 13/628,731

(22) Filed: Sep. 27, 2012

(65) Prior Publication Data

US 2013/0083298 A1    Apr. 4, 2013

(30) Foreign Application Priority Data

Sep. 30, 2011  (JP) ................. 2011-216327
Sep. 30, 2011  (JP) ................. 2011-216716

(51) Int. Cl.
| | | |
|---|---|---|
| G03B 21/14 | (2006.01) | |
| G03B 21/00 | (2006.01) | |
| H04N 9/31 | (2006.01) | |

(52) U.S. Cl.
CPC ............ *G03B 21/006* (2013.01); *H04N 9/3185* (2013.01); *G03B 21/142* (2013.01)
USPC ................. 353/69; 353/30; 353/70; 348/746; 348/747

(58) Field of Classification Search
USPC ........................ 353/30, 31, 38, 69–70, 98–99; 348/744–747, 750, 751, 658, 657; 349/5, 7–9
See application file for complete search history.

(56) References Cited

U.S. PATENT DOCUMENTS

| | | | |
|---|---|---|---|
| 5,532,764 A * | 7/1996 | Itaki ............................. 348/745 |
| 7,053,966 B2 | 5/2006 | Lee et al. | |
| 7,121,667 B2 | 10/2006 | Moriwaki et al. | |
| 7,182,464 B2 * | 2/2007 | Ejiri et al. ....................... 353/69 |
| 8,287,136 B2 * | 10/2012 | Kobori et al. ................... 353/69 |
| 8,529,069 B2 * | 9/2013 | Oka ............................... 353/69 |
| 2002/0060754 A1 * | 5/2002 | Takeuchi ....................... 348/745 |
| 2005/0190343 A1 * | 9/2005 | Kuwabara et al. ............ 353/70 |
| 2006/0092096 A1 | 5/2006 | Sakashita | |
| 2007/0195211 A1 * | 8/2007 | Fujimori ........................ 349/5 |
| 2010/0128231 A1 * | 5/2010 | Furui ............................. 353/70 |

FOREIGN PATENT DOCUMENTS

| | | |
|---|---|---|
| JP | 3682966 B | 8/2005 |
| JP | 3740487 B | 2/2006 |
| JP | 3845386 B | 11/2006 |
| JP | 2010-250041 A | 11/2010 |

* cited by examiner

*Primary Examiner* — Sultan Chowdhury
(74) *Attorney, Agent, or Firm* — ALG Intellectual Property, LLC

(57) ABSTRACT

A projector that projects an image allows selection of one of a plurality of controlled objects located in correspondence with the vertices of the contour of the image and the sides of the contour, moves the selected controlled object within the image based on input operation, and corrects the contour of the image based on the moved controlled object.

12 Claims, 22 Drawing Sheets

PROJECTOR AND METHOD FOR CONTROLLING PROJECTOR

BACKGROUND

The entire disclosure of Japanese Patent Application Nos. 2011-216716, filed Sep. 30, 2011 and 2011-216327, filed Sep. 30, 2011 are expressly incorporated by reference herein.

1. TECHNICAL FIELD

The present invention relates to a projector and a method for controlling the projector.

2. RELATED ART

There has been a known method for projecting an image from a projector and geometrically correcting the projected image on a user interface screen of a computer. For example, there has been a known geometric correction interface using an auxiliary line (Japanese Patent No. 3,845,386), in which application software that runs on a computer virtually narrows the area of a user interface screen and displays the thus narrowed screen to provide a virtual correction area that allows a user to correct an auxiliary line that does not fall within the screen and perform auxiliary-line-based correction even when a display having resolution lower than the panel size of the projector is used.

Further, there has been a known projector that allows a user to display an image for the correction to readily correct trapezoidal distortion produced depending on the angle at which a projector is installed with respect to a projection surface (see JP-A-2010-250041, for example).

In the correction method described in Japanese Patent No. 3,845,386, however, it is necessary to use a computer having application software for correction installed therein to geometrically correct the projection screen of a projector. The correction cannot therefore be made by using the projector alone. Further, the user has to make correction while comparing the display screen of the computer with the projection screen projected from the projector. It has therefore been desired to provide a projector that allows the user to geometrically correct a projected image (correct the shape of a projected image) by using the projector alone based on simple operation.

Further, an image projected by a projector is sometimes distorted, what is called pincushion distortion, depending on the state of the projection surface. Since pincushion distortion cannot be corrected only by moving the corners of the projected image, the configuration of the related art described above cannot solve the problem. It has therefore been desired to provide a projector that allows the user to readily correct pincushion distortion.

SUMMARY

An advantage of some aspects of the invention is to provide a projector that allows a user to geometrically correct a projected image (correct the shape of a projected image) by using the projector alone based on simple operation and a method for controlling the projector.

Another advantage of some aspects of the invention is to provide a projector that allows the user to readily correct pincushion distortion (i.e., arc correction) and a method for controlling the projector.

The present invention can be implemented in the following forms or application examples.

An aspect of the invention is directed to a projector that projects an image and includes an operation reception unit that receives input operation, a selection unit that allows selection of one of a plurality of controlled objects located in correspondence with vertices of a contour of the image and sides of the contour, and a correction unit that allows movement of the controlled object selected by using the selection unit within the image based on the input operation and corrects the contour of the image based on the moved controlled object.

According to the projector described above, one of the controlled objects located in correspondence with the vertices of the contour of an image projected by the projector and the sides of the contour is selected, and the selected controlled object is moved based on input operation. The contour is then corrected based on the moved controlled object. The user can therefore correct the geometric shape of the contour of the image by moving any of the controlled objects of the image, which is a function of the projector.

The projector described above may be configured such that the selection unit is a control point selection unit that handles the vertices of the contour of the image based on the image information and predetermined points located on the sides of the contour as control points that are the controlled objects and allows selection of one of the plurality of control points as a selected control point, and the correction unit includes a control point movement unit that allows movement of the selected control point selected by using the control point selection unit within the image based on the input operation and an image correction unit that forms a contour of the image in such a way that the contour passes through the selected control point moved by using the control point movement unit and corrects the image information to fit in the formed contour.

According to the projector described above, the selection unit handles the vertices of the contour of the image and predetermined points located on the sides of the contour as control points and allows selection of one of the control points as a selected control point. The control point movement unit provided in the correction unit allows movement of the selected control point within the image based on the input operation, and the image correction unit forms a contour of the image in such a way that the contour passes through the selected control point moved by using the control point movement unit and corrects the image information to fit in the formed contour. The user can therefore correct the shape of the contour of the image by moving the selected control point. The projector then corrects the image information to fit in the contour having the corrected shape. The geometric shape of the image based on the image information can thus be corrected by using the projector alone.

The projector described above may be configured such that the image correction unit forms a contour of the image in such a way that the selected control point is connected to an adjacent one of the control points with a curve.

According to the projector described above, the image correction unit forms an image by connecting the control point to an adjacent one of the control points with a curve. As a result, the image has a contour including the curve, and the image information corrected by the image correction unit represents an image having a curved contour. Projecting the thus formed image having a curved contour can cancel curved distortion of the image on a curved projection surface.

The projector described above may be configured such that each of the predetermined points is at least one point located on the corresponding side of the contour.

According to the projector described above, each of the predetermined points is at least one point located on the corresponding side of the contour. The thus set predetermined points along with the four vertices format least eight control points in total, which allow formation of a contour of the image, whereby the projector can be operated in a simple, effective manner.

The projector described above may be configured such that a default position of each of the predetermined points is the center of the corresponding side of the contour.

According to the projector described above, a default position of each of the predetermined points is the center of the corresponding side of the contour. The user can therefore form an image formation region in a well balanced manner.

The projector described above may be configured such that each of the predetermined points is movable based on the input operation along a line connecting the default position to the center of the image.

According to the projector described above, each of the predetermined points is movable along a line connecting the default position to the center of a pixel region. The formation of an image formation region, correction of image information, and other software processing can therefore be simplified.

The projector described above may be configured to further include a light source, a light modulator that modulates light emitted from the light source, a projection system that projects image light modulated by the light modulator, and an identification image display unit that projects the image light through the projection system to display eight identification images corresponding to four corners of the image carried by the image light and four sides between the corners. The selection unit may include a selection operation unit that receives operation of selecting one of the eight identification images displayed by the identification image display unit, an enhancement display unit that enhances the identification image selected by the selection operation unit to be distinguishable from the other identification images and displays the enhanced identification image, and a movement operation unit that, in a state in which the enhancement display unit displays the enhanced identification image, receives operation of moving the controlled object located at the corner or in a predetermined position on the side. The correction unit moves the corner or the predetermined position on the side corresponding to the identification image selected by the selection operation unit based on the operation received by the movement operation unit and corrects pincushion distortion based on the movement.

The projector described above displays the eight identification images corresponding to the four corners and the four sides of a projected image, selects one of the identification images and displays the selected identification image, and corrects pincushion distortion based on operation on the identification image, whereby operation of correcting the pincushion distortion can be readily carried out.

The projector described above may be configured such that the enhancement display unit adds direction marks that correspond to at least two axes and are movable by using the movement operation unit to the identification image selected by using the selection operation unit from the identification images corresponding to the corners and adds a direction mark that corresponds to one axis and is movable by using the movement operation unit to the identification image selected by using the selection operation unit from the identification images corresponding to the sides.

According to the projector described above, since optimum direction marks are added to the corners and sides and displayed, the user can be guided to appropriate operation, whereby the operation of correcting pincushion distortion can be more readily carried out.

The projector described above may be configured to be capable of choosing an operation mode thereof between a pincushion distortion correction mode in which pincushion distortion is corrected and a trapezoidal distortion correction mode in which trapezoidal distortion is corrected. In the trapezoidal distortion correction mode, the identification image display unit may display four identification images corresponding to the four corners of the image. The selection operation unit may receive operation of selecting one of the four identification images displayed by the identification image display unit. In a state in which the enhancement display unit displays the selected identification image, the movement operation unit may receive operation of moving the corner. The image correction unit may move the corner corresponding to the identification image selected by using the selection operation unit based on the operation received by the movement operation unit and correct trapezoidal distortion based on the movement.

According to the projector described above, operation of correcting trapezoidal distortion can be readily carried out as well as operation of correcting pincushion distortion.

The projector described above may be configured such that the enhancement display unit disables display of the other seven identification images that have not been selected by using the selection operation unit in the pincushion distortion correction mode whereas disabling display of the other three identification images that have not been selected by using the selection operation unit in the trapezoidal distortion correction mode.

According to the projector described above, the operation of correcting pincushion distortion and trapezoidal distortion can be more readily carried out under optimum display.

The projector described above may be configured such that, in a state in which the corner or the predetermined position on the side selected by using the selection operation unit is located at a limit of a movable range and hence unable to move in a predetermined direction, the enhancement display unit reduces visibility of the direction mark corresponding to the predetermined direction.

According to the projector described above, the state of the displayed direction mark notifies the user of the limit of the operation of moving the corner or the side, whereby the operation of correcting pincushion distortion can be more readily carried out.

Another aspect of the invention is directed to a method for controlling a projector that projects an image based on image information and includes selecting one of a plurality of controlled objects located in correspondence with vertices of a contour of the image based on the image information and sides of the contour, moving the controlled object selected in the selecting within the image based on input operation; and correcting the contour of the image based on the controlled object moved in the moving.

According to the method for controlling a projector described above, one of the controlled objects located in correspondence with the vertices of the contour of an image projected by the projector and the sides of the contour is selected, and the selected controlled object is moved based on input operation. The contour is then corrected based on the moved controlled object. The user can therefore correct the geometric shape of the contour of the image by moving any of the controlled objects of the image, which is a function of the projector.

The method for controlling a projector described above may be configured such that the selecting is a control point selection in which the vertices of the contour of the image based on the image information and predetermined points located on the sides of the contour are handled as control points that are the controlled objects and one of the plurality of control points is selected as a selected control point. In the moving, the selected control point selected in the control point selection may be moved within the image based on the input operation. In the correcting, a contour of the image may be so formed that the contour passes through the selected control point moved in the moving and the image information is corrected to fit in the formed contour.

According to the method for controlling a projector described above, the user can correct the shape of the contour of the image by moving the selected control point. The projector then corrects the image information to fit in the contour having the corrected shape. The geometric shape of the image based on the image information can thus be corrected by using the projector alone.

The method for controlling a projector described above may be configured such that, in the selecting, image light is projected through a projection system to display eight identification images corresponding to four corners of the image carried by the image light and four sides between the corners. Operation of selecting one of the eight identification images may be received. The selected identification image may be so enhanced and displayed that the enhanced identification image is distinguishable from the other identification images. In the moving, in a state in which the enhanced identification image is displayed, operation of moving the corner or a predetermined position on the side may be received, and the corner or the predetermined position on the side corresponding to the identification image selected in the selecting may be moved based on the received operation. In the correcting, pincushion distortion may be corrected based on the movement in the moving.

The method for controlling a projector described above includes displaying the eight identification images corresponding to the four corners and the four sides of a projected image, selecting one of the identification images and displaying the selected identification image, and correcting pincushion distortion based on operation on the identification image, whereby operation of correcting the pincushion distortion can be readily carried out.

When the method for controlling the projector described above are configured by using a computer incorporated in the projector, the forms and the application examples described above can also be configured in the form of program for providing the functions of the projector and the method for controlling the projector or in the form of a recording medium or any other component on which the program is so recorded that the program is readable by the computer. Examples of the recording medium may include a variety of media readable by the computer, such as a flexible disk, an HDD (hard disk drive), a CD-ROM (compact disk read only memory), a DVD (digital versatile disk), a Blu-ray Disc®, an magneto-optical disk, a nonvolatile memory card, a storage device (RAM (random access memory), a ROM (read only memory), and any other semiconductor memory) built in the projector, and a storage device (such as USB memory) external to the projector.

According to the above aspects of the invention, the geometric shape of an image based on image information can be corrected by using a projector alone.

BRIEF DESCRIPTION OF THE DRAWINGS

The invention will be described with reference to the accompanying drawings, wherein like numbers reference like elements.

FIG. 4A shows a projected image including a corner adjustment image, and FIG. 4B shows a projected image including a side adjustment image.

FIG. 8A is a side view of a projector and a projection surface viewed sideways, and FIG. 8B is a front view showing the projection surface.

FIG. 9A is a side view of the projector and the projection surface viewed sideways. FIGS. 9B and 9D are front views showing the projection surface. FIG. 9C shows a pixel region of a liquid crystal light valve.

FIG. 10A is a perspective view of the projector and the projection surface viewed obliquely downward. FIGS. 10B, 10D, 10F, and 10H show the pixel region of the liquid crystal light valve. FIGS. 10C, 10E, and 10G are front views showing the projection surface.

FIG. 13A shows a corner selection image, and FIG. 13B shows a corner adjustment image.

DESCRIPTION OF EXEMPLARY EMBODIMENTS

Projectors according to embodiments will be described below with reference to the drawings.

The embodiments presented below will be described with reference to a projector capable of correcting the shape of a projected image. The projector described in each of the embodiments is an optical apparatus that modulates light emitted from a light source to form an image based on externally inputted image information (hereinafter referred to as "input image") and projects the image on a screen, a wall, or any other surface (hereinafter referred to as "projection surface").

First Embodiment

Figure 1:
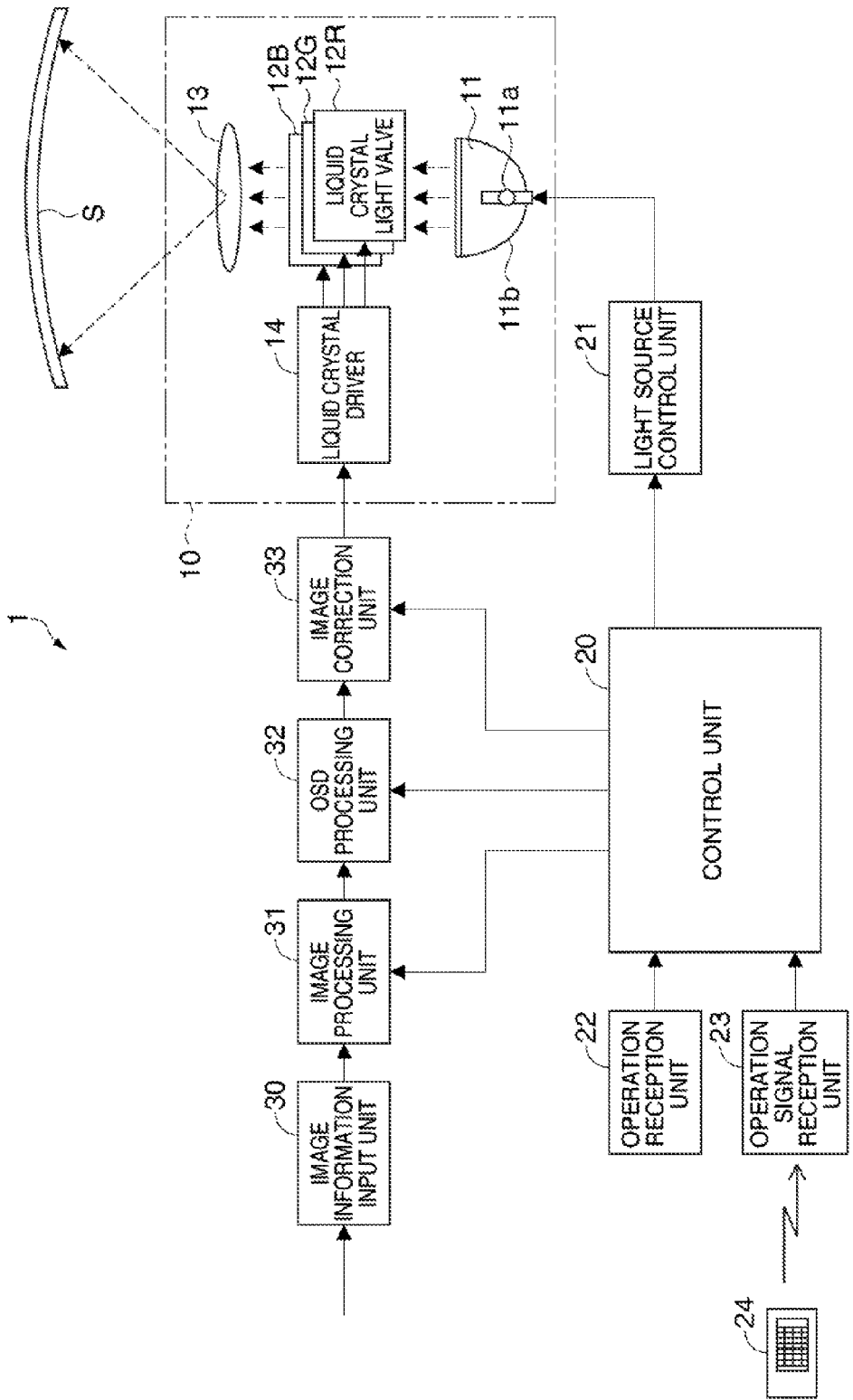
FIG. 1 is a block diagram showing a schematic configuration of a projector according to a first embodiment.

FIG. 1 is a block diagram showing a schematic configuration of a projector according to a first embodiment. The internal configuration of the projector will be described with reference to FIG. 1.

A projector 1 includes an image projection unit 10, a control unit 20, a light source control unit 21, an operation reception unit 22, an operation signal reception unit 23, a remote control 24, an image information input unit 30, an image processing unit 31, an OSD processing unit 32, and an image correction unit 33, as shown in FIG. 1.

The image projection unit 10 includes a light source apparatus 11 as a light source, three liquid crystal light valves 12R, 12G, and 12B as light modulators, a projection lens 13 as a projection system, and a liquid crystal driver 14. In the image projection unit 10, the liquid crystal light valves 12R, 12G, and 12B modulate light outputted from the light source apparatus 11 into image light, and the projection lens 13 projects and displays the image light on a projection surface S.

The light source apparatus 11 includes a discharge-type light source lamp 11a formed, for example, of an ultra-high-pressure mercury lamp or a metal halide lamp, and a reflector 11b that reflects the light emitted from the light source lamp 11a toward the liquid crystal light valves 12R, 12G, and 12B. The light outputted from the light source apparatus 11 is converted by an optical integration system (not shown) into light having a substantially uniform luminance distribution, separated by a color separation system (not shown) into red (R), green (G), and blue (B) color light components, which are three primary colors of light, and then incident on the liquid crystal light valves 12R, 12G, and 12B.

Each of the liquid crystal light valves 12R, 12G, and 12B is formed, for example, of a liquid crystal panel having a liquid crystal material sealed between a pair of transparent substrates. Each of the liquid crystal light valves 12R, 12G, and 12B has a rectangular pixel region in which a plurality of pixels (not shown) are arranged in a matrix and can apply a drive voltage to the liquid crystal material on a pixel basis. When the liquid crystal driver 14 applies a drive voltage according to inputted image information to each of the pixels, the pixel sets its optical transmittance at a value according to the image information. As a result, the light outputted from the light source apparatus 11 is modulated when passing through the image regions of the liquid crystal light valves 12R, 12G, and 12B to form image light fluxes corresponding to the three colors according to the image information. The thus formed image light fluxes corresponding to the three colors are combined on a pixel basis by a light combining system (not shown) into color image light, which is enlarged and projected by the projection lens 13.

The control unit 20 includes a CPU (central processing unit), a RAM (random access memory) used to temporarily store a variety of data and other information, and a nonvolatile ROM (read only memory) and oversees the control of the operation of the projector 1 by instructing the CPU to operate in accordance with a control program stored in the ROM. That is, the control unit 20 functions as a computer.

The light source control unit 21 controls the light source apparatus 11 (light source lamp 11a) to go on based on an instruction from the control unit 20. Specifically, the light source control unit 21 allows the light source lamp 11a to go on by supplying a predetermined amount of electricity to the light source lamp 11a and go off by stopping supplying the electricity. Further, the light source control unit 21 can adjust the luminance (brightness) of the light source lamp 11a by controlling the amount of electricity supplied to the light source lamp 11a based on an instruction from the control unit 20.

The operation reception unit 22, which receives user's input operation, includes a plurality of operation keys that allow the user to issue a variety of instructions to the projector 1. The operation keys provided on the operation reception unit 22 include a power key for turning on and off a power supply, an input switch key for switching an inputted image signal from one to another, a menu key for displaying and hiding a menu image for setting a variety of items, four directional keys corresponding to the upward, downward, rightward, and leftward directions (upward key, downward key, rightward key, and leftward key), an enter key for accepting a variety of settings, and an ECS (escape) key used to cancel or otherwise deselect operation. When the user operates (presses) any of the variety of operation keys on the operation reception unit 22, the operation reception unit 22 receives the input operation and outputs an operation signal according to the user's operation to the control unit 20.

The remote control 24 includes a plurality of operation keys as the operation reception unit 22 does. When the user operates any of the variety of operation keys on the remote control 24, the remote control 24 issues an operation signal in the form of infrared light or any other form according to the user's operation, and the operation signal reception unit 23 receives the operation signal and forward it to the control unit 20. The operation signal reception unit 23, which receives an operation signal from the operation reception unit 22 or the remote control 24, corresponds to an operation reception unit in the appended claims.

The image information input unit 30 includes a plurality of input terminals, to which image information in a variety of formats is inputted from a video reproduction apparatus, a personal computer, and other external image supply apparatus (not shown). The image information input unit 30 outputs the inputted image information to the image processing unit 31.

The image processing unit 31 converts the image information inputted from the image information input unit 30 into image information representing grayscales of the pixels of the liquid crystal light valves 12R, 12G, and 12B, that is, image information for defining a drive voltage applied to each of the pixels. Further, the image processing unit 31 performs, for example, image quality adjustment for adjusting image quality, such as brightness, contrast, sharpness, and tint, on the converted image information based on an instruction from the control unit 20 and outputs the processed image information to the OSD processing unit 32.

The OSD processing unit 32 overlays an OSD (on-screen display) image, such as the menu image and a message image, on an image according to inputted image information (hereinafter also referred to as "input image") based on an instruction from the control unit 20. The OSD processing unit 32 includes an OSD memory (not shown), which stores OSD image information representing figures, fonts, and other parameters for forming OSD images. When the control unit 20 instructs to overlay an OSD image, the OSD processing unit 32 reads necessary OSD image information from the OSD memory and combines the OSD image information with image information inputted from the image processing unit 31 in such a way that the OSD image is overlaid on the input image in a predetermined position. The image information with which the OSD image information combined is outputted to the image correction unit 33. When the control unit 20 does not instruct to overlay an OSD image, the OSD processing unit 32 does not process image information inputted from the image processing unit 31 but directly outputs it to the image correction unit 33.

The image correction unit 33 corrects curved distortion produced, for example, when an image is projected on a curved projection surface S (also referred to as "bow-shape correction"). Specifically, the image correction unit 33 sets an image formation region having a shape that cancels the curved distortion in the pixel region of each of the liquid crystal light valves 12R, 12G, and 12B and not only corrects image information inputted from the OSD processing unit 32 in such a way that the input image is formed in the image formation region but also sets each pixel outside the image formation region at a black pixel value, that is, a pixel value that minimizes optical transmittance.

The image correction unit 33 outputs the thus corrected image information to the liquid crystal driver 14. The projection surface S in the present embodiment is a concave surface, and hence an image projected on the projection surface S is displayed as a barrel-shaped curved image. The curved distortion can therefore be canceled by forming a pincushion-shaped image formation region in each of the pixel regions. When the control unit 20 does not instruct to correct curved distortion, the image correction unit 33 does not process image information inputted from the OSD processing unit 32 but directly outputs it to the liquid crystal driver 14. In this case, the entirety of each of the pixel regions serves as the image formation region, and an image (input image) is formed over the entire pixel region.

When the liquid crystal driver 14 drives the liquid crystal light valves 12R, 12G, and 12B in accordance with image information inputted from the image correction unit 33, the liquid crystal light valves 12R, 12G, and 12B produce modulated image light fluxes according to the image information, and the projection lens 13 projects the image light fluxes.

A description will next be made of the bow-shape correction (curved distortion correction) performed by the projector 1.

The projector 1 according to the first embodiment can correct curved distortion by using the image correction unit 33 as described above. Specifically, when the menu key provided on the operation reception unit 22 or the remote control 24 is pressed, the menu image is displayed. When a bow-shape correction (curved distortion correction) item in the menu image is selected, a control point area selection image for allowing the user to select an area where curved distortion is corrected is displayed. When a desired control point area is selected in the control point area selection image, a curved distortion correction image corresponding to the selected control point area is displayed. In the curved distortion correction image, the user can move the control point by operating the direction keys to correct the curved distortion. In the present embodiment, the vertices at the four corners of the contour of an input image and four points located at the centers of the four sides of the contour are used as the control points.

Figure 2:
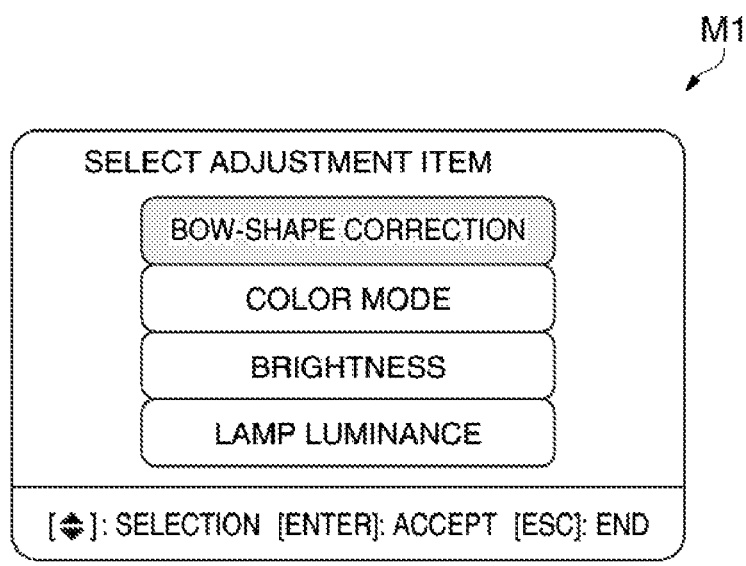
FIG. 2 describes a menu image displayed by the projector.

FIG. 2 describes the menu image displayed by the projector 1 according to the present embodiment.

In the menu image M1, a plurality of items (adjustment items) are arranged in the vertical direction, as shown in FIG. 2. In the example shown in FIG. 2, the following four items are displayed: "bow-shape correction" for correcting curved distortion; "color mode" for setting an image quality adjustment mode (color mode); "brightness" for adjusting the brightness of an image; and "lamp luminance" for adjusting the luminance of the light source lamp 11*a*. One of the four adjustment items ("bow-shape correction" in FIG. 2) differs from the other items in terms of background color, which indicates that the item has been selected. The menu image M1 is displayed by the OSD processing unit 32.

In the state in which the menu image M1 is displayed, the user can select a desired adjustment item by operating the upward and downward direction keys. When the user selects a desired adjustment item and operates the enter key, the selected adjustment item is accepted and a setting image associated with the adjustment item can be displayed. Further, the user can stop displaying the menu image M1 by operating the ESC key.

Figure 3:
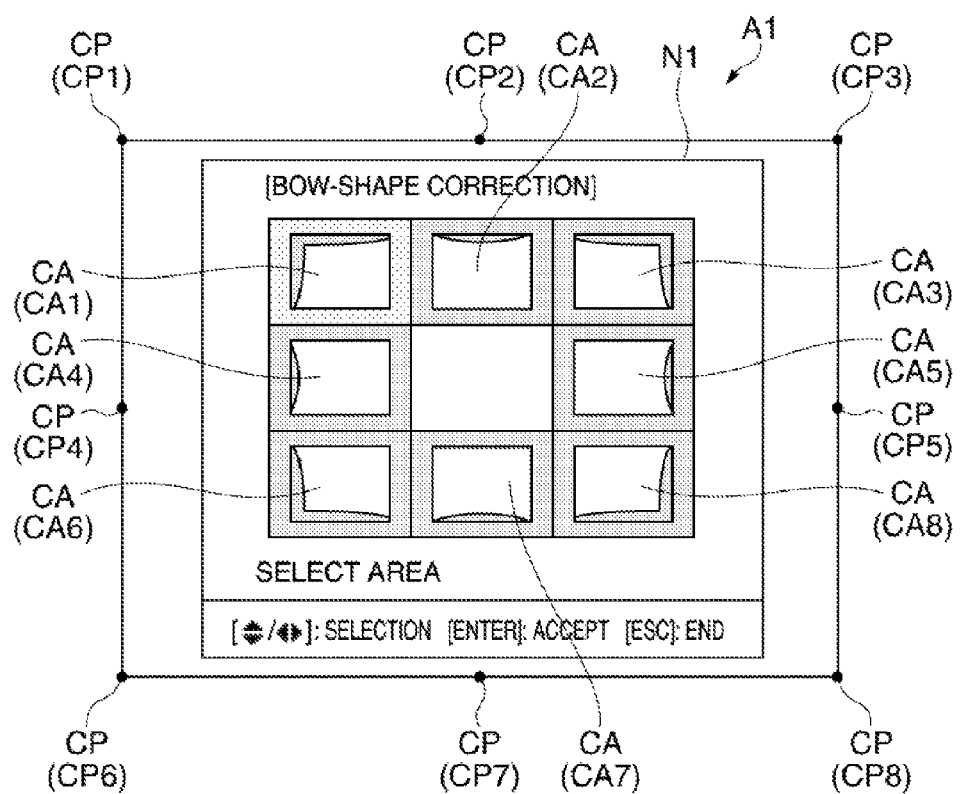
FIG. 3 shows a projected image in which a control point area selection image for bow-shape correction is displayed.

FIG. 3 shows a projected image in which a control point area selection image for bow-shape correction is displayed.

A projected image A1 is displayed with a control point area selection image N1 overlaid thereon as an OSD image, as shown in FIG. 3. A character string "[bow-shape correction]" is displayed in an upper portion of the control point area selection image N1, and eight control point area images CA associated with the input image are displayed below the character string. The eight control point area images CA are formed of four control point area images CA (CA1, CA3, CA6, and CA8) corresponding to control points CP (CP1, CP3, CP6, and CP8) at the four corners of the input image and four control point area images CA (CA2, CA4, CA5, and CA7) corresponding to control points CP (CP2, CP4, CP5, and CP7) at the centers of the four sides of the input image.

One of the control point area images CA1 to CA8 (control point area image CA1 in the example shown in FIG. 3) is colored differently from the other seven, which indicates that the differently colored control point area image CA has been selected. In FIG. 3, the eight control points CP are displayed as visible "points," but they are not visible in an actual projected image.

A character string "Select area" for prompting the user to select a control point area image CA is displayed in a lower portion of the control point area selection image N1. The following other character strings representing what the user can do are further displayed: change a control point area image (CA1 to CA8) to be selected by operating the upward, downward, rightward, and leftward direction keys; accept a control point area image CA by operating the enter key; and stop displaying the control point area selection image N1 by operating the ESC key. The user can select a desired control point area image CA by operating the direction keys, and the selection of a control point area image CA is accepted by operating the enter key after the control point area image CA is selected. When the selection of a control point area image CA is accepted, a bow-shape correction adjustment image corresponding to the selected control point area image CA is displayed. The control point CP corresponding to the selected control point area image CA corresponds to a selected control point. In the bow-shape correction adjustment image, the position of the control point CP corresponding to the selected control point area image CA can be adjusted.

Figure 4A:
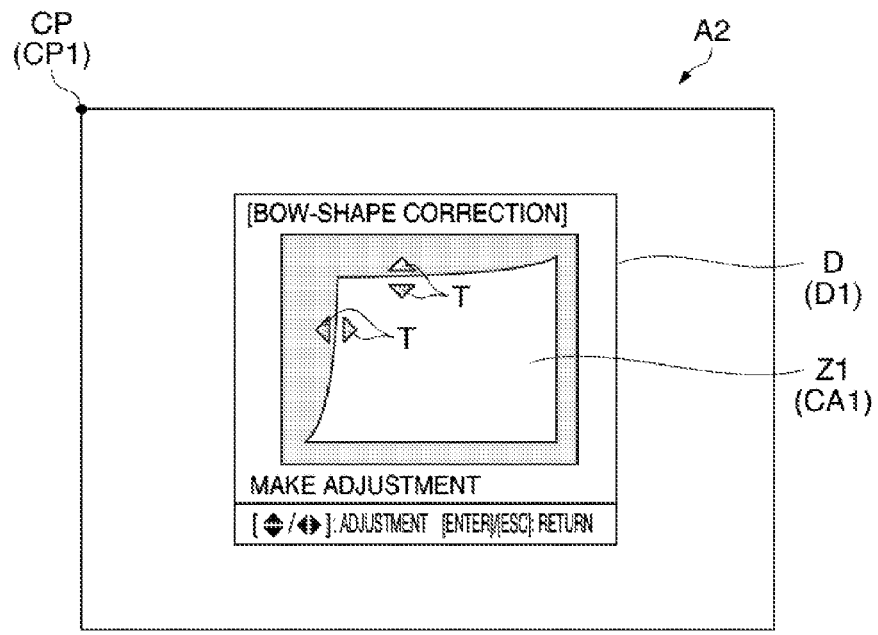
FIGS. 4A and 4B show projected images in each of which a bow-shape correction adjustment image is displayed.
Figure 4B:
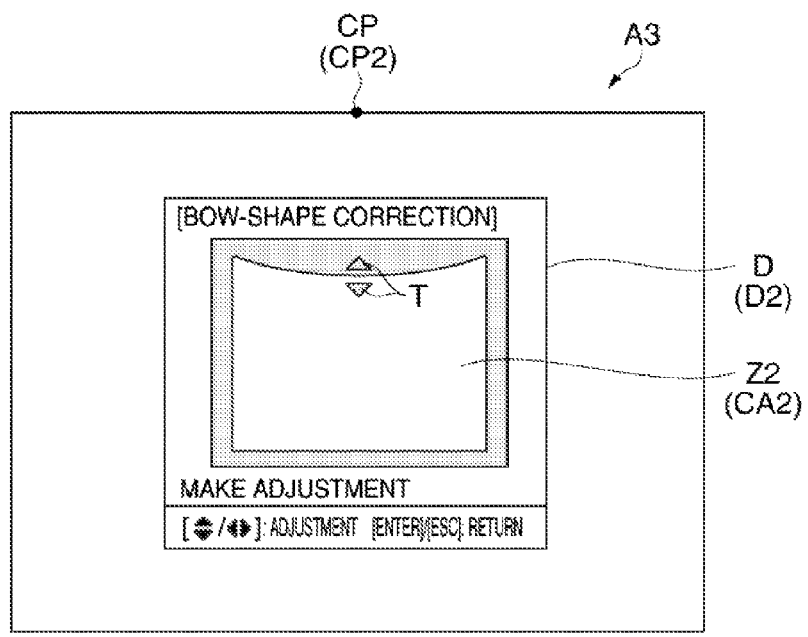

FIGS. 4A and 4B show projected images in each of which a bow-shape correction adjustment image is displayed. FIG.

4A shows a projected image including a corner adjustment image, and FIG. 4B shows a projected image including a side adjustment image.

A projected image A2 is displayed with a bow-shape correction adjustment image D (D1) overlaid thereon as an OSD image, as shown in FIG. 4A. A character string "[bow-shape correction]" is displayed in an upper portion of the bow-shape correction adjustment image D1. The control point area image CA1 is enlarged and displayed as an enlarged image Z1 below the character string.

The enlarged image Z1 has additional triangular direction marks T pointing upward, downward, rightward, and leftward, which indicate that the corner displayed in the control point area image CA1 (that is, control point CP1) is movable upward, downward, rightward, and leftward (position is adjustable). Further, a message "Make adjustment" is displayed in a lower portion of the bow-shape correction adjustment image D1, prompting the user to adjust the position of the control point CP1. In the state in which the bow-shape correction adjustment image D1 is displayed, the user can adjust the position of the control point CP1 (corner) by operating the direction keys. When the position of the control point CP1 is changed, the projected image A2 is corrected to a bow-shape image based on the position of the control point CP1 (curved distortion correction).

The following other character strings representing what the user can do are displayed in a lower portion of the bow-shape correction adjustment image D1: adjust the bow-shape correction by operation the upward, downward, rightward, and leftward direction keys; and terminate the adjustment and return to the control point area selection image N1 by operating the enter key or the ESC key. It is noted that the range within which the position of the control point CP1 is adjusted by operating the direction keys is limited to the pixel region of each of the liquid crystal light valves 12R, 12G, and 12B.

A projected image A3 is displayed with a bow-shape correction adjustment image D (D2) overlaid thereon as an OSD image, as shown in FIG. 4B. A character string "[bow-shape correction]" is displayed in an upper portion of the bow-shape correction adjustment image D2. The control point area image CA2 is enlarged and displayed as an enlarged image Z2 below the character string.

The enlarged image Z2 has additional triangular direction marks T pointing upward and downward, which indicate that a central portion (that is, control point CP2) of the side displayed in the control point area image CA2 is movable upward and downward (position is adjustable). Further, a message "Make adjustment" is displayed in a lower portion of the bow-shape correction adjustment image D2, prompting the user to adjust the position of the control point CP2 on the side. In the state in which the bow-shape correction adjustment image D2 is displayed, the user can adjust the position of the control point CP2 (central portion of side) by operating the direction keys. When the position of the control point CP2 is changed, the projected image A3 is corrected to a bow-shaped image based on the position of the control point CP2 (curved distortion correction).

The following other character strings representing what the user can do are displayed in a lower portion of the bow-shape correction adjustment image D2: adjust the bow-shape correction by operating the upward and downward direction keys; and terminate the adjustment and return to the control point area selection image N1 by operating the enter key or the ESC key. It is noted that the range within which the position of the control point CP2 is adjusted by operating the direction keys is within the pixel region of each of the liquid crystal light valves 12R, 12G, and 12B and, in the present embodiment, along the line connecting the center of the side of the contour of the input image to the center of the pixel region, that is, the center of the image.

The description has been made with reference to the bow-shape correction adjustment images D1 and D2. Substantially the same thing holds true for bow-shape correction adjustment images D corresponding to the control point area images CA3 to CA8, and the positions of the control points CP3 to CP8 are adjustable. As in the case of the control point CP2, the range within which the position of each of the control points CP4, CP5, and CP7 is adjusted is within the pixel region of each of the liquid crystal light valves 12R, 12G, and 12B and along the line connecting the center of the side of the contour of the input image to the center of the pixel region.

A description will next be made of processes that the projector 1 carries out to perform the bow-shape correction (curved distortion correction).

Figure 5:
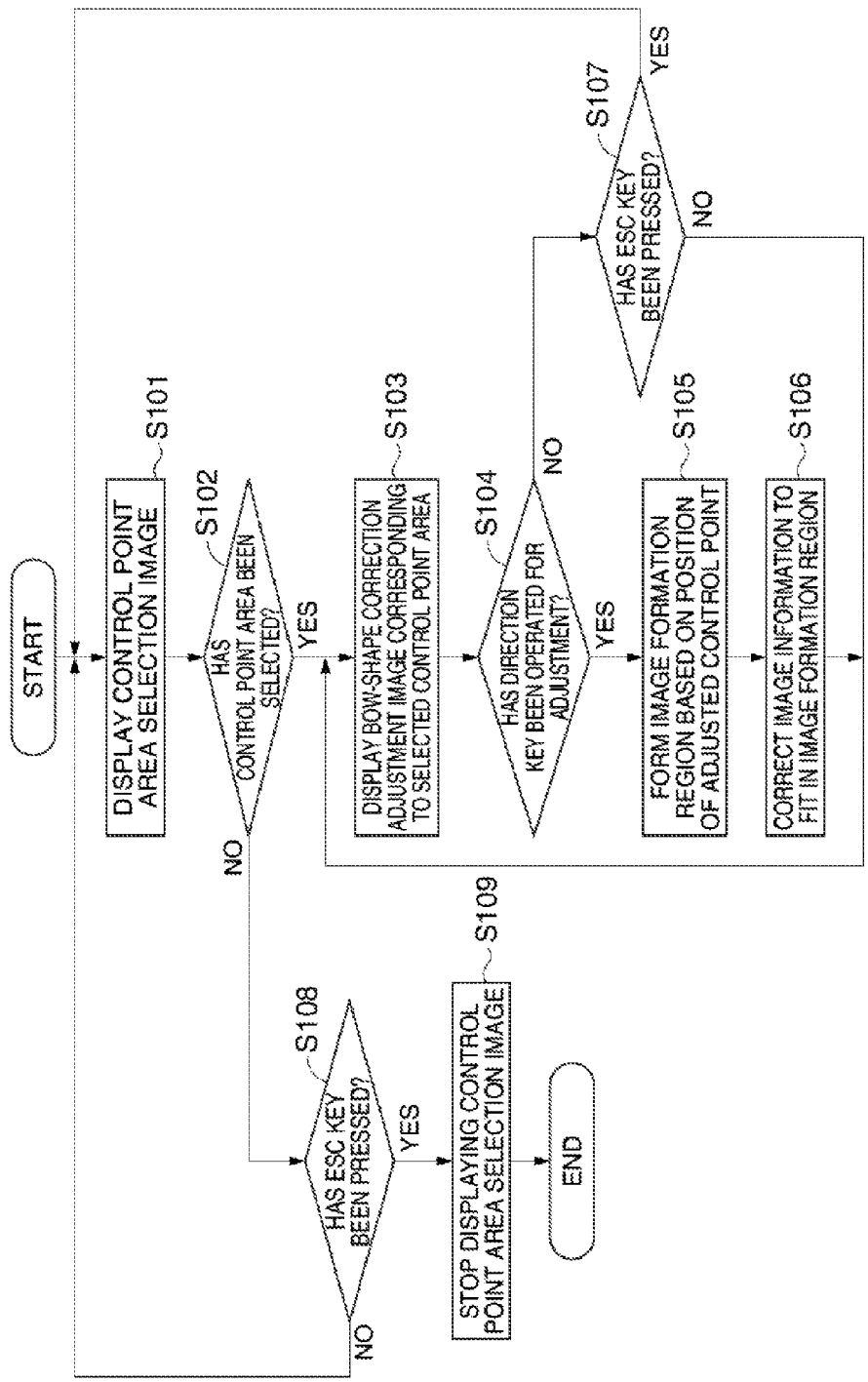
FIG. 5 is a flowchart of the processes that the projector carries out to perform bow-shape correction.

FIG. 5 is a flowchart of processes that the projector 1 according to the present embodiment carries out to perform the bow-shape correction.

When the bow-shape correction is selected in the menu image M1, the control unit 20 instructs the OSD processing unit 32 to display the control point area selection image N (step S101). The control unit 20 then determines whether or not any of the control point area images CA (that is, any of the control points CP) has been selected (step S102). The control unit 20 and the OSD processing unit 32 in this process correspond to a selection unit and a control point selection unit, and the operation of the projector 1 in this process corresponds to a selection step and a control point selection step. When any of the control point area images CA is selected (step S102: YES), the control unit 20 instructs the OSD processing unit 32 to display the bow-shape correction adjustment image D corresponding to the selected control point area image CA (step S103).

The control unit 20 determines whether or not any of the direction keys has been operated for adjustment (step S104). When any of the direction keys has been operated for adjustment (step S104: YES), the control unit 20 instructs the image correction unit 33 to form an image formation region based on the position of the adjusted control point CP (step S105). The control unit 20 that moves the control point CP for adjustment corresponds to a control point movement unit, and the operation of the control unit 20 corresponds to a movement step. In this process, the image correction unit 33 forms an image formation region, that is, the image contour in such a way that the adjusted control point CP is connected to adjacent control points CP with a bow-shape curve. The operation of the image correction unit 33 corresponds to a correction step.

The image correction unit 33 corrects the image information to fit in the image formation region (step S106). The image correction unit 33 that corrects image information corresponds to an image correction unit. The control unit 20 then returns to step S103.

When no direction key has been operated for adjustment (step S104: NO), the control unit 20 determines whether or not the ESC key has been pressed (step S107). When the ESC key has not been pressed, the control unit 20 returns to step S103. When the ESC key has been pressed (step S107: YES), the control unit 20 returns to step S101.

When no control point area has been selected (step S102: NO), the control unit 20 determines whether or not the ESC key has been pressed (step S108). When the ESC key has not been pressed (step S108: NO), the control unit 20 returns to step S101. When the ESC key has been pressed (step S108: YES), the control unit 20 instructs the OSD processing unit 32 to stop displaying the control point area selection image N1 (step S109). The bow-shape correction is then terminated.

A description will next be made of an image having undergone the bow-shape correction described above.

Figure 6:
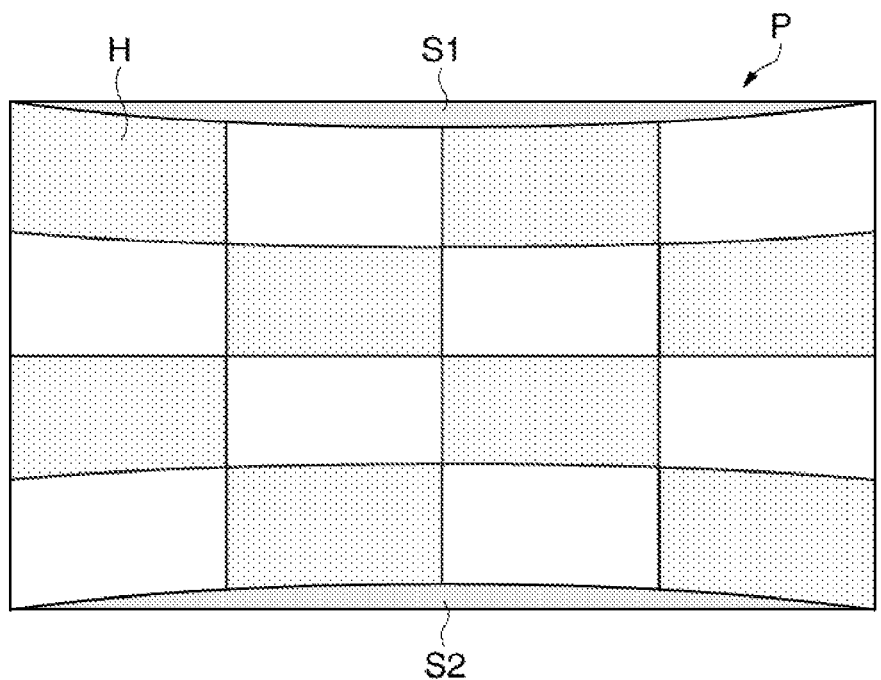
FIG. 6 is a plan view showing a pixel region having undergone the bow-shape correction.

FIG. 6 is a plan view showing a pixel region having undergone the bow-shape correction.

FIG. 6 shows a state in which the control point area images CA2 and CA7 (that is, control points CP2 and CP7) have undergone the bow-shape correction; an image formation region H having a pincushion distorted shape has been formed in a pixel region P; and image information has been corrected. Regions S1 and S2 outside the image formation region H in the pixel region P are blackened (light hardly passes through regions S1 and S2). After the bow-shape correction described above is made, the projector 1 outputs a distorted image having a pincushion shape and corrected to fit in the image formation region H. For example, when the projection surface S is concavely curved, the user projects an image on the concave projection surface S while performing the bow-shape correction (curved distortion correction). The distorted projected image having the pincushion shape can thus correct the curved distortion on the projection surface S and provide a rectangular shape.

Although not shown, a distorted image formation region H having a barrel shape can also be formed in the pixel region P. Specifically, a barrel-shaped image formation region H can be formed by performing inward bow-shape correction with respect to the pixel region P on the control point area images CA1, CA3, CA6, and CA8. The image information is thus corrected to fit in the barrel-shaped image formation region H. When the projection surface S is convexly curved, curved distortion on the projection surface S can be corrected by projecting a barrel-shaped image from the projector 1.

The first embodiment provides the following advantageous effects.

(1) The projector 1 displays the control point area selection image N1 and allows the user to select any of the control point area images CA (that is, any of the control points CP). The projector 1 displays a bow-shape correction adjustment image D corresponding to the selected control point area image CA. The user can adjust the position of the control point CP in the pixel region P. The image correction unit 33 in the projector 1 then forms an image formation region H in such a way that the contour thereof passes through the adjusted control point CP. Further, the image correction unit 33 corrects image information to fit in the image formation region H. The user can thus correct the shape of a projected image by operating the direction keys provided on the operation reception unit 22 or the remote control 24 to move the control point CP while viewing the projected image. That is, the user can readily correct the shape of the projected image without any prior knowledge. Further, since the geometric shape of a projected image can be corrected by using the projector 1 alone, the convenience of the user is improved.

(2) The image correction unit 33 in the projector 1 forms an image formation region H by connecting the adjusted control point CP to adjacent control points CP with a bow-shaped curve. As a result, the image formation region H has a shape including the curve, and the image information corrected by the image correction unit 33 represents an image having a curved contour. Projecting the thus formed image having a curved contour can cancel curved distortion on the projection surface S that is curved.

(3) In the projector 1, the control point CP is placed at each of the four vertices (corners) of the contour of an image based on image information and at a point on each of the four sides of the contour. The thus set eight control points (CP1 to CP8) allow the user to form an image formation region H and operate the projector 1 in a simple, effective manner.

(4) In the projector 1, default positions of the control points CP on the four sides (CP2, CP4, CP5, and CP7) are the centers of the respective sides of the contour of an image. The user can therefore adjust the control points CP by using the direction keys, that is, form an image formation region H in a well balanced manner.

(5) In the projector 1, each of the control points CP on the four sides (CP2, CP4, CP5, and CP7) can be adjusted along the line connecting the default position to the center of the pixel region. The formation of an image formation region H, correction of image information, and other software processing can therefore be simplified.

The invention is not limited to the first embodiment, and a variety of changes, improvements, and other modifications can be made thereto. Variations of the first embodiment will be described below.

Variation 1

In the embodiment described above, eight control points CP (CP1 to CP8) are provided, but the number of control points CP is not limited to eight. For example, when the number of control points CP is greater than eight, more precise correction can be made.

Variation 2

In the embodiment described above, the default positions of the control points CP on the sides (CP2, CP4, CP5, and CP7) of the contour of an image based on image information are centers of the sides, but the default positions are not limited to the centers.

Variation 3

In the embodiment described above, each of the control points CP2, CP4, CP5, and CP7 on the sides is adjusted along the line connecting the center of the side to the center of the pixel region, but the adjustment is not necessarily made this way. The control points CP2, CP4, CP5, and CP7 may alternatively be adjustable obliquely.

Variation 4

In the embodiment described above, the light source apparatus 11 includes the discharge-type light source lamp 11a, but an LED (light emitting diode) light source, a laser, and other solid-state light sources, and other suitable light sources can be used.

Variation 5

In the embodiment described above, the projector 1 uses the transmissive liquid crystal light valves 12R, 12G, and 12B as the light modulators, but reflective liquid crystal light valves and other reflective light modulators can be used. Further, a micromirror array device that modulates light emitted from a light source by controlling the direction of light incident on each micromirror as a pixel and other similar devices can be used.

Second Embodiment

A second embodiment to which the invention is applied will next be described. In the second embodiment, trapezoidal distortion of an image projected on the projection surface S and distortion called pincushion distortion, barrel distortion, or otherwise named are corrected.

Figure 7:
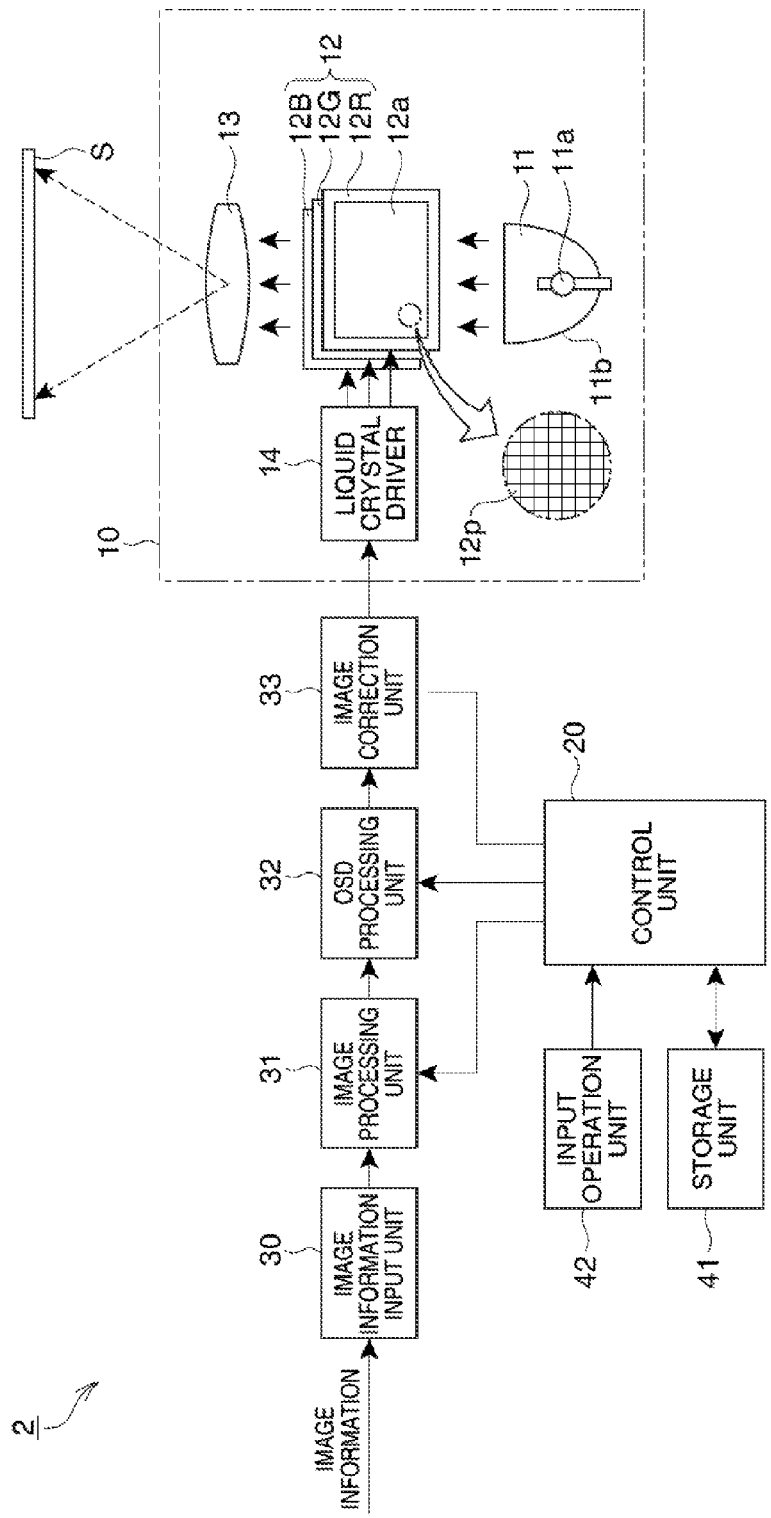
FIG. 7 is a block diagram showing a schematic configuration of a projector according to a second embodiment.

FIG. 7 is a block diagram showing a schematic configuration of a projector 2 according to the second embodiment.

The projector 2 shown in FIG. 7 includes an image projection unit 10, a control unit 20, a storage unit 41, an input operation unit 42, an image information input unit 30, an image processing unit 31, an OSD processing unit 32, and an image correction unit 33. In the second embodiment, components common to those in the first embodiment have the same names and reference characters, and no description thereof will therefore be made.

In the image projection unit 10, which corresponds to a display unit according to the invention, light outputted from the light source apparatus 11 is modulated by the liquid crystal light valves 12 to form an image (image light), and the image is enlarged and projected by the projection lens 13 and displayed on the projection surface S, as in the image projection unit 10 in the projector 1 described above.

As described above, each of the liquid crystal light valves 12 is formed, for example, of a liquid crystal panel having a liquid crystal material sealed between a pair of transparent substrates. Each of the liquid crystal light valves 12 has a rectangular pixel region 12a formed of a plurality of pixels 12p arranged in a matrix and can apply a drive voltage to the liquid crystal material for each of the pixels 12p. When the liquid crystal driver 14 applies a drive voltage according to inputted image information to each of the pixels 12p, the pixel 12p sets its optical transmittance at a value according to the image information. As a result, the light outputted from the light source apparatus 11 is modulated when passing through the image regions 12a of the liquid crystal light valves 12 to form color images according to the image information.

The thus formed color images are combined for each of the pixels 12p by a light combining system (not shown) into a single color image, which is then enlarged and projected by the projection lens 13 on the projection surface S. The projection lens 13 has a zoom mechanism (not shown) for changing a factor according to which an image is magnified, and the user can adjust the size of a displayed image by using the zoom mechanism.

In the present specification, the entirety of an image projected through the projection lens 13 is called a "projected image." A projected image is produced by projecting an image formed across the entire pixel region 12a, and even when the entirety or part of the pixel region 12a is blackened (light hardly passes therethrough), the whole range including the portion corresponding to the blackened region is a projected image. Further, for example, when an image is projected toward the screen, and even when part of the image lies offscreen and is projected, for example, on a wall behind the screen, the whole range including the offscreen portion is a projected image.

In the present embodiment, the control unit 20 is connected to the storage unit 41, which stores, for example, a control program, and operates in accordance with the control program stored in the storage unit 41 to oversee the control of the operation of the projector 2. That is, the control unit 20 along with the storage unit 41 functions as a computer.

The storage unit 41 is formed of a mask ROM (read only memory), a flash memory, an FeRAM (ferroelectric RAM), or any other nonvolatile memory. The storage unit 41 stores, for example, the control program for controlling the operation of the projector 2 and a variety of setting data that define operation conditions and other parameters under which the projector 2 operates.

The input operation unit 42, which has the same function as that of the operation reception unit 22 described above and receives user's input operation, includes a plurality of operation keys that allow the user to issue a variety of instructions to the projector 2. The operation keys provided on the input operation unit 42 include a power key for turning on and off a power supply, a menu key for displaying a menu image for a variety of settings, an enter key for accepting an item selected, for example, in the menu image, four directional keys corresponding to the upward, downward, rightward, and leftward directions, and a cancel key for instructing to cancel or otherwise deselect operation. The input operation unit 42 in the present embodiment further includes a pincushion distortion correction key for correcting pincushion distortion and a trapezoidal distortion correction key for correcting trapezoidal distortion. When the user operates any of the variety of operation keys on the input operation unit 42, the input operation unit 42 outputs an operation signal according to the user's operation to the control unit 20. The input operation unit 42 may alternatively be a remote control (not shown) that allows remote operation. In this case, the remote control sends an infrared operation signal according to user's operation, and a remote control signal receiver (not shown) receives the operation signal and forwards it to the control unit 20.

The image correction unit 33 corrects an image (image information) based on an instruction from the control unit 20. In the second embodiment, the image correction unit 33 sets an image formation region 12e having a shape set by the user in the pixel region 12a of each of the liquid crystal light valves 12 (see FIG. 9C). Image information inputted from the OSD processing unit 32 is so corrected that an input image Pi is formed in the image formation region 12e. Further, the image correction unit 33 sets each pixel 12p outside the image formation region 12e at a black pixel value, that is, a pixel value that minimizes optical transmittance in order to disable the region outside the image formation region 12e. The image correction unit 33 outputs the thus corrected image information to the liquid crystal driver 14. When the control unit 20 does not instruct image correction, the image correction unit 33 does not process the image information inputted from the OSD processing unit 32 but directly outputs it to the liquid crystal driver 14. In this case, the input image Pi is formed across the entire pixel region 12a. In other words, the entirety of the pixel region 12a is the image formation region 12e.

A description will next be made of a summary of trapezoidal distortion correction performed by the projector 2.

Figures 8A, 8B:
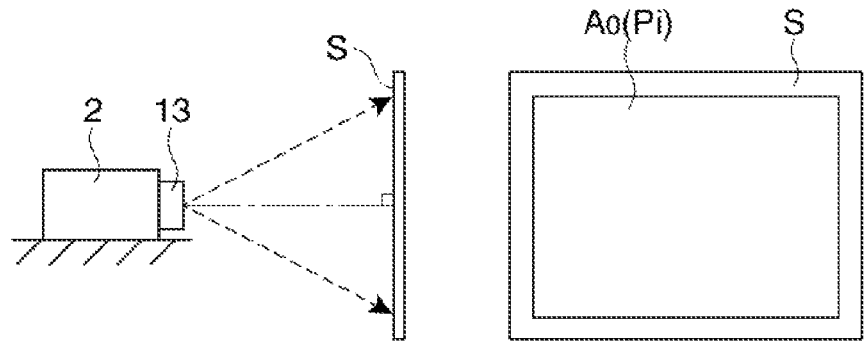
FIGS. 8A and 8B describe trapezoidal distortion.
Figure 9A:
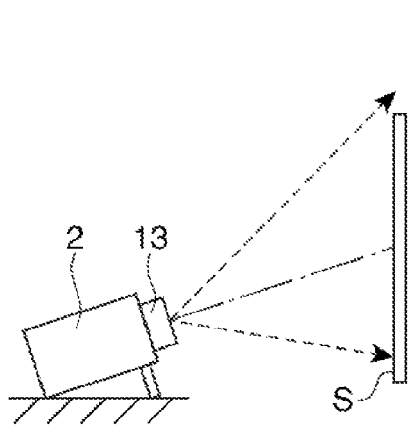
FIGS. 9A to 9D describe trapezoidal distortion.
Figure 9B:
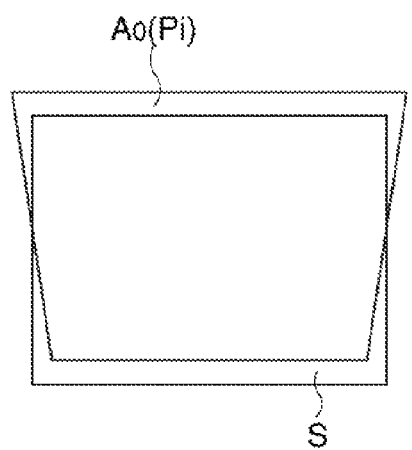
Figure 9C:
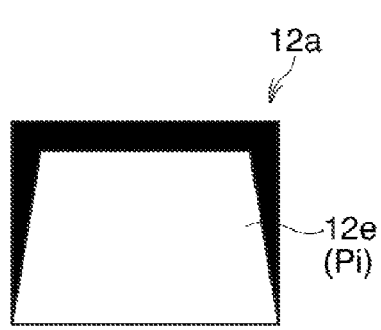
Figure 9D:
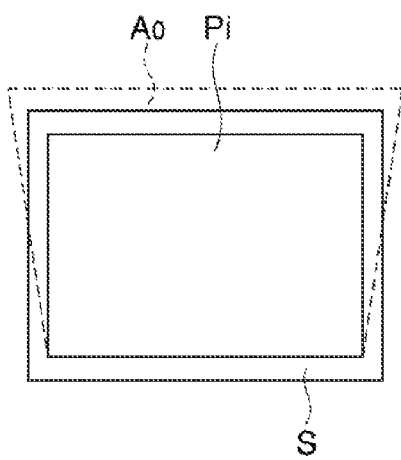

FIGS. 8A and 8B and FIGS. 9A to 9D describe trapezoidal distortion. FIGS. 8A and 9A are side views of the projector 2 and the projection surface S viewed sideways. FIGS. 8B, 9B, and 9D are front views showing the projection surface S. FIG. 9C shows the pixel region 12a of each of the liquid crystal light valves 12.

In a state in which the projector 2 is not inclined to the projection surface S, that is, in a state in which the optical axis of the projection lens 13 is oriented in substantially the same direction as a normal to the projection surface S as shown in FIG. 8A, a projected image Ao is accompanied by no trapezoidal distortion and displayed in a normal (rectangular) shape, as shown in FIG. 8B. In this case, since an input image Pi only needs to be formed across the entire pixel region 12a, the image correction unit 33 need to make no correction, and zoom adjustment, adjustment of the position where the projector 2 is installed, and other adjustment may be so made as appropriate that the projected image Ao (input image Pi) is displayed across the entire projection surface S.

On the other hand, in a state in which the projector 2 is inclined to the projection surface S, that is, in a state in which the optical axis of the projection lens 13 is oriented in a direction different from the direction of a normal to the projection surface S as shown in FIG. 9A, a projected image Ao is accompanied by trapezoidal distortion as shown in FIG. 9B. As a result, a displayed input image Pi, when formed across the entire pixel region 12a, is distorted by trapezoidal distortion. To address the problem, an image formation region 12e having a shape capable of canceling the trapezoidal distortion, that is, a shape distorted oppositely to the projected image Ao, is set in the pixel region 12a, as shown in FIG. 9C, and the input image Pi is formed in the thus set image formation region 12e. In this way, the distorted shape of the image formation region 12e (input image Pi) is canceled by the trapezoidal distortion, whereby the input image Pi displayed on the projection surface S shows the original (rectangular) shape with the trapezoidal distortion corrected (see FIG. 9D).

As described above, since the input operation unit 42 includes the trapezoidal distortion correction key, the user can operate the trapezoidal distortion correction key to set the shape of the image formation region 12e.

Further, when the projection surface S is curved, distortion called pincushion distortion, barrel distortion, or otherwise named (hereinafter referred to as pincushion distortion) occurs.

Figure 10A:
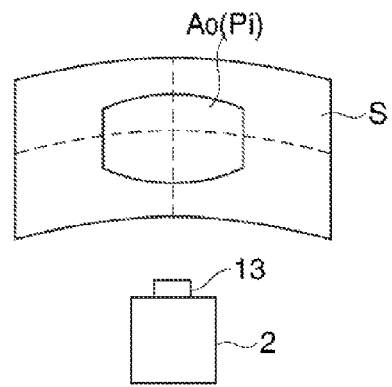
FIGS. 10A to 10H describe pincushion distortion.
Figure 10B:
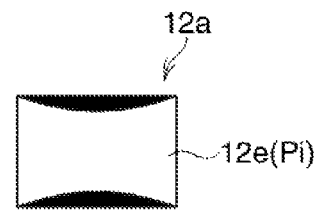
Figure 10C:
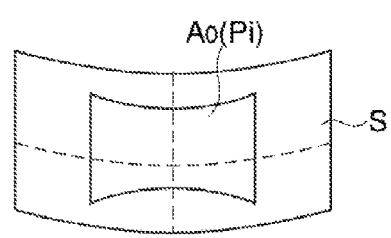
Figure 10D:
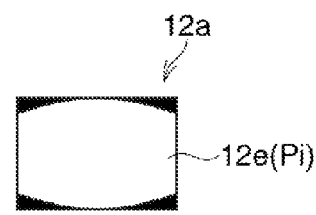
Figure 10E:
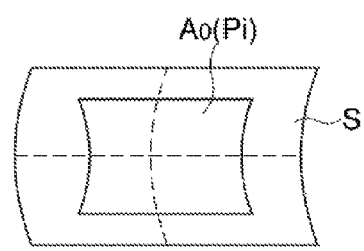
Figure 10F:
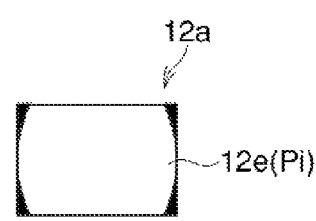
Figure 10G:
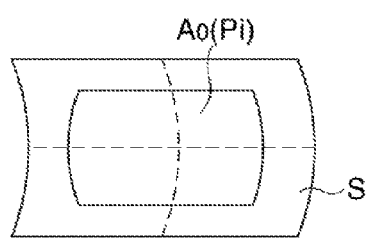

FIGS. 10A to 10H describe pincushion distortion. FIG. 10A is a perspective view of the projector and the projection surface viewed obliquely downward. FIGS. 10B, 10D, 10F, and 10H show the pixel region of one of the liquid crystal light valves. FIGS. 10C, 10E, and 10G are front views showing the projection surface.

In FIG. 10A, which shows a state in which the projector 2 is installed in front of the projection surface S, no trapezoidal distortion occurs but a projected image Ao is accompanied by distortion that convexly curves the upper and lower sides of a projected image Ao because the projection surface S is curved. When an input image Pi is formed across the entire pixel region 12a, the displayed input image Pi, which is displayed as a rectangular image if the projection surface S is flat, is distorted by pincushion distortion.

In the example shown in FIG. 10A, the projection surface S is not distorted in the up-down direction, that is, the vertical direction but is (cylindrically) curved to form a convex shape whose center in the right-left direction, that is, the horizontal direction separates away from the projector 2. In this case, the projected image Ao is accompanied by barrel distortion that curves the upper and lower lines.

To address the problem, an image formation region 12e having a shape capable of canceling the pincushion distortion, that is, a shape distorted oppositely to the projected image Ao is set in the pixel region 12a, as shown in FIG. 10B, and the input image Pi is formed in the thus set image formation region 12e. The distorted shape of the image formation region 12e (input image Pi) is canceled by the pincushion distortion, whereby the input image Pi is displayed on the projection surface S in the original (rectangular) shape with the pincushion distortion corrected, as in the state shown in FIG. 9D.

Further, when the projector 2 is installed as shown in FIG. 10A and inclined to the projection surface S as shown in FIG. 9A, both the trapezoidal distortion shown in FIG. 9B and the pincushion distortion shown in FIG. 10A occur. In this case, a projected image Ao is distorted by the trapezoidal distortion and the pincushion distortion, for example, into a barrel shape having a widened upper portion. In this case, the shape of the image formation region 12e formed in the pixel region 12a is first so deformed that one of the trapezoidal distortion and the pincushion distortion is corrected and then so deformed that the other distortion is corrected. A rectangular projected image Ao can thus be displayed on the projection surface S.

FIG. 10C shows a case where the projection surface S is a cylindrical surface convex toward the projector 2. In this case, a projected image Ao is accompanied by pincushion distortion opposite to that shown in FIG. 10A. To correct the distortion, an image formation region 12e having a shape distorted oppositely to the projected image Ao is set in the pixel region 12a, as shown in FIG. 10D. The pincushion distortion can be canceled, and a rectangular input image Pi can be displayed on the projection surface S.

FIG. 10E shows a case where the projection surface S is a cylindrical surface that is not distorted in the horizontal direction but is distorted in the vertical direction and has a convex shape that separates away from the projector 2. In this case, a projected image Ao projected on the projection surface S is so distorted that the right and left vertical sides are curved. To correct the distortion, an image formation region 12e having a shape distorted oppositely to the projected image Ao is set in the pixel region 12a, as shown in FIG. 10F. The pincushion distortion can be canceled, and a rectangular input image Pi can be displayed on the projection surface S.

Figure 10H:
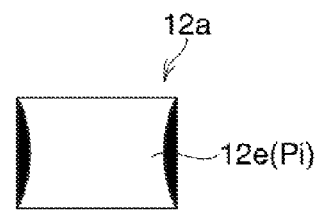

FIG. 10G shows a case where the projection surface S is a cylindrical surface that is not distorted in the horizontal direction but is distorted in the vertical direction and the projection surface S is convex toward the projector 2, which is opposite to FIG. 10E. In this case, a projected image Ao projected on the projection surface S is so distorted that the right and left vertical sides are curved. To correct the distortion, an image formation region 12e having a shape distorted oppositely to the projected image Ao is set in the pixel region 12a, as shown in FIG. 10H. The pincushion distortion can be canceled, and a rectangular input image Pi can be displayed on the projection surface S.

In a case where the projection surface S is a more complicated surface, such as an elliptically curved surface and a parabolic surface, as well as in the surfaces shown in FIGS. 10A, 10C, 10E, and 10G, a rectangular projected image Ao can be displayed by forming an image formation region 12e that cancels pincushion distortion produced by the curved surface in the pixel region 12a.

As described above, since the input operation unit 42 includes the pincushion distortion correction key, the user can operate the pincushion distortion correction key to set the shape of the image formation region 12e for pincushion distortion correction.

Figure 11:
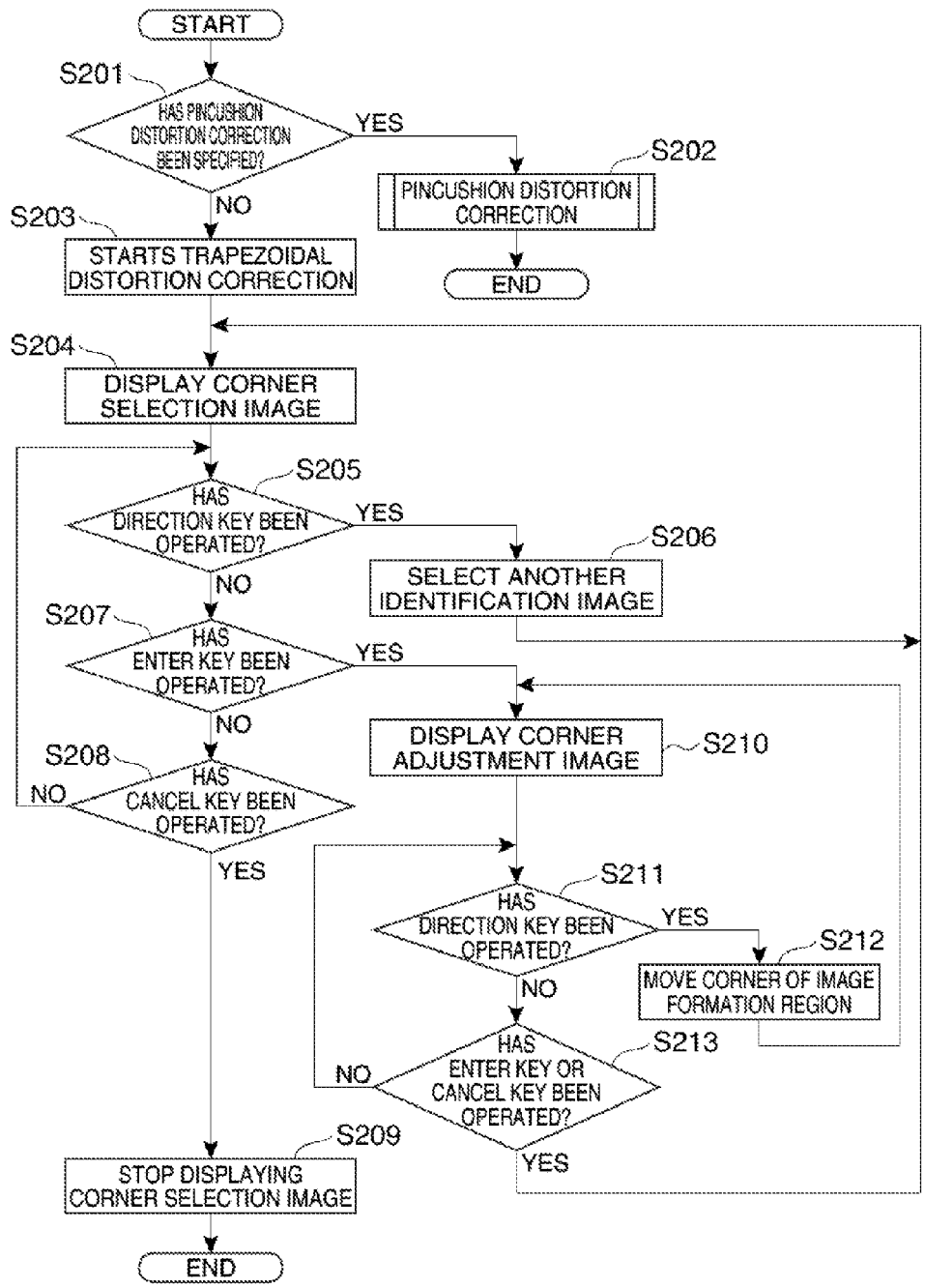
FIG. 11 is a flowchart for describing the operation of the projector when a trapezoidal distortion correction key or a pincushion distortion correction key is operated.

FIG. 11 is a flowchart for describing the operation of the projector 2 when the trapezoidal distortion correction key or the pincushion distortion correction key is operated. In the operation shown in FIG. 11 and FIG. 12, which will be described later, the control unit 20 cooperates with the OSD processing unit 32 and functions as an identification image display unit and an enhancement display unit, and the input operation unit 42 functions as a selection operation unit and a movement operation unit under the control of the control unit 20. The selection operation unit and the movement operation unit correspond to the selection unit.

In a state in which the projector 2 projects an input image Pi, and when the user operates the trapezoidal distortion correction key or the pincushion distortion correction key, the control unit 20 operates in accordance with the procedure shown in FIG. 11. The input operation unit 42 may alternatively be provided with a distortion correction key corresponding to both the pincushion distortion correction and the trapezoidal distortion correction. In this case, a menu screen that allows the user to choose the pincushion distortion correction or the trapezoidal distortion correction is displayed by the projector 2 in response to user's operation of the distortion correction key, and the pincushion distortion correction or the trapezoidal distortion correction is chosen on the menu screen by operating the input operation unit 42. In this configuration, only one distortion correction operation key is required on the input operation unit 42, and the user only needs to operate the distortion correction key instinctively without identifying the type of distortion when it is difficult to identify the distortion of a projected image Ao on the projection surface S to be trapezoidal distortion or pincushion distortion or when a combination of trapezoidal distortion and pincushion distortion occurs, whereby the operability of the projector can be improved.

As shown in FIG. 11, the control unit 20 determines in step S201 which correction the user has instructed to make by key operation through the input operation unit 42, pincushion distortion correction or trapezoidal distortion correction. When the user instructs to make pincushion distortion correction, the control unit 20 starts a pincushion distortion correction mode and makes pincushion distortion correction, which will be described later, in step S202. The control unit 20 then terminates the procedure.

When the user instructs to make trapezoidal distortion correction, the control unit 20 proceeds to step S203, where the control unit 20 starts a trapezoidal distortion correction mode and makes the trapezoidal distortion correction. The control unit 20 then instructs the OSD processing unit 32 in step S204 to display an input image Pi with a corner selection image Ps (see FIG. 13A) overlaid thereon. Steps S202 to S210 correspond to the selection step.

Figure 13A:
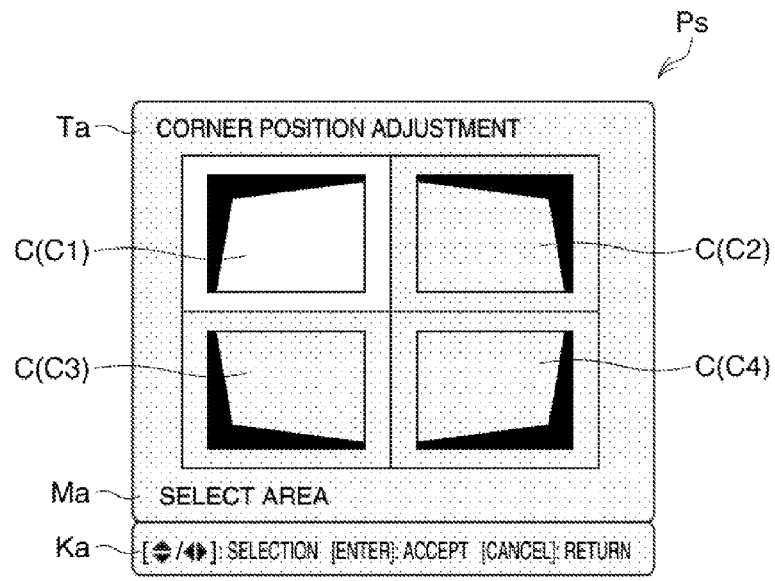
FIGS. 13A and 13B show images displayed when trapezoidal distortion correction is in progress.
Figure 13B:
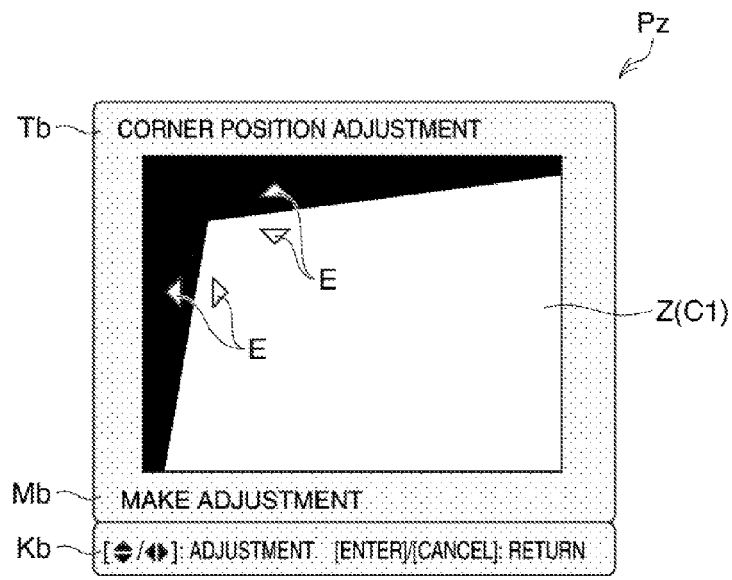

FIGS. 13A and 13B show images displayed when the trapezoidal distortion correction is in progress. FIG. 13A shows the corner selection image Ps, and FIG. 13B shows a corner adjustment image Pz.

The corner selection image Ps has a title section Ta, four identification images C corresponding to the four corners of an input image Pi, that is, the four corners of an image formation region 12e, a message section Ma where a message for the user is displayed, and a key guide section Ka that guides the user to operable operation keys and the operation thereof.

The four identification images C are formed of an identification image C1 corresponding to the upper left corner of the image formation region 12e (input image Pi), an identification image C2 corresponding to the upper right corner, an identification image C3 corresponding to the lower left corner, and an identification image C4 corresponding to the lower right corner, and they all have the same size. The identification images C1 to C4 are arranged in a matrix formed of two rows by two columns and disposed in the matrix in the corresponding positions (for example, the identification image C1 corresponding to the upper left corner is disposed in an upper left portion of the matrix). Each of the identification images C1 to C4 has an illustration representing the corresponding corner drawn therein.

The title section Ta displays "Corner position adjustment," which clearly shows the user that the function intends to correct trapezoidal distortion by adjusting the position of any of the corners. The message section Ma displays "Select area," prompting the user to select one of the corners by selecting one of the identification images C1 to C4. The selected one (identification image C1 in the example shown in FIG. 13A) of the identification images C1 to C4 is colored differently from the other three, which shows that the differently colored identification image C has been selected. In the following sections, the color of an identification image C that has been selected is also called a "selected state color," and the color of identification images C that have not been selected is also called an "unselected state color." The user can select a desired identification image C by operating the direction keys, and the selection of an identification image C is accepted by operating the enter key after the identification image C is selected.

The corner adjustment image Pz has a title section Tb, an enlarged image display section Z, a message section Mb where a message for the user is displayed, and a key guide section Kb that guides the user to operable operation keys and the operation thereof, as shown in FIG. 13B. The title section Tb displays "Corner position adjustment," as the title section Ta in the corner selection image Ps does.

The enlarged image display section Z displays an enlarged identification image C (identification image C1 in the example shown in FIG. 13B) selected from the four identification images C1 to C4 described above in the corner selection image Ps but does not display the unselected three identification images C. The enlarged image display section Z also has additional triangular direction marks E pointing upward, downward, rightward, and leftward, which indicate that the corner corresponding to the enlarged identification image C is movable upward, downward, rightward, and leftward (position is adjustable). The message section Mb displays "Make adjustment," prompting the user to adjust the position of the corner. In the state in which the corner adjustment image Pz is displayed, the user can adjust the position of the corner by operating the direction keys.

In step S205 in FIG. 11, the control unit 20 determines whether or not the user has operated any of the direction keys. When no direction key has been operated, the control unit 20 proceeds to step S207, whereas when any of the direction keys has been operated, the control unit 20 proceeds to step S206.

In step S206, the control unit 20 newly selects one of the other identification images C located in the direction specified by the operated direction key, and the control unit 20 returns to step S204. At this point, in the corner selection image Ps, the newly selected identification image C is displayed in the selected state color, whereas the previously selected identification image C is displayed in the unselected state color.

In step S207, the control unit 20 determines whether or not the user has operated the enter key. When the enter key has not been operated, the control unit 20 proceeds to step S208, whereas when the enter key has been operated, the control unit 20 proceeds to step S210.

In step S208, the control unit 20 determines whether or not the user has operated the cancel key. When the cancel key has not been operated, the control unit 20 returns to step S205, whereas when the cancel key has been operated, the control unit 20 proceeds to step S209.

In step S209, the control unit 20 instructs the OSD processing unit 32 to terminate the overlay display of the corner selection image Ps and terminates the procedure.

In step S210, the control unit 20 instructs the OSD processing unit 32 to display the corner adjustment image Pz (see FIG. 13B) as an overlaid image instead of the corner selection image Ps.

The control unit 20 subsequently determines in step S211 whether or not any of the direction keys has been operated. When any of the direction keys has been operated, the control unit 20 proceeds to step S212, whereas when no direction key has been operated, the control unit 20 proceeds to step S213.

In step S212, the control unit 20 instructs the image correction unit 33 to move the selected corner in the direction specified by the operated direction key, and the control unit 20 returns to step S210. The operation corresponds to the movement step. For example, when the identification image C1 is selected, that is, the upper left corner is selected in the corner selection image Ps, the image correction unit 33 sets the upper left corner of the image formation region 12e as an object to be moved and moves the upper left corner by a predetermined amount in the direction specified by the operated direction key, as shown in FIGS. 14A to 14I. Thereafter, the image correction unit 33 corrects the image information in such a way that the input image Pi is formed in the image formation region 12e newly shaped by moving the corner. When the user repeatedly operates any of the direction keys or presses any of the direction keys for a long time, steps S211 and S212 are repeatedly carried out, and the selected corner can be moved by a necessary amount.

It is noted that the upward, downward, rightward, and leftward directions of a projected input image Pi do not necessarily agree with the upward, downward, rightward, and leftward directions of the liquid crystal light valves 12. In this case, a corner of an image formation region 12e is so moved that a corner of the projected input image Pi is moved in a direction according to user's operation.

Figure 14:
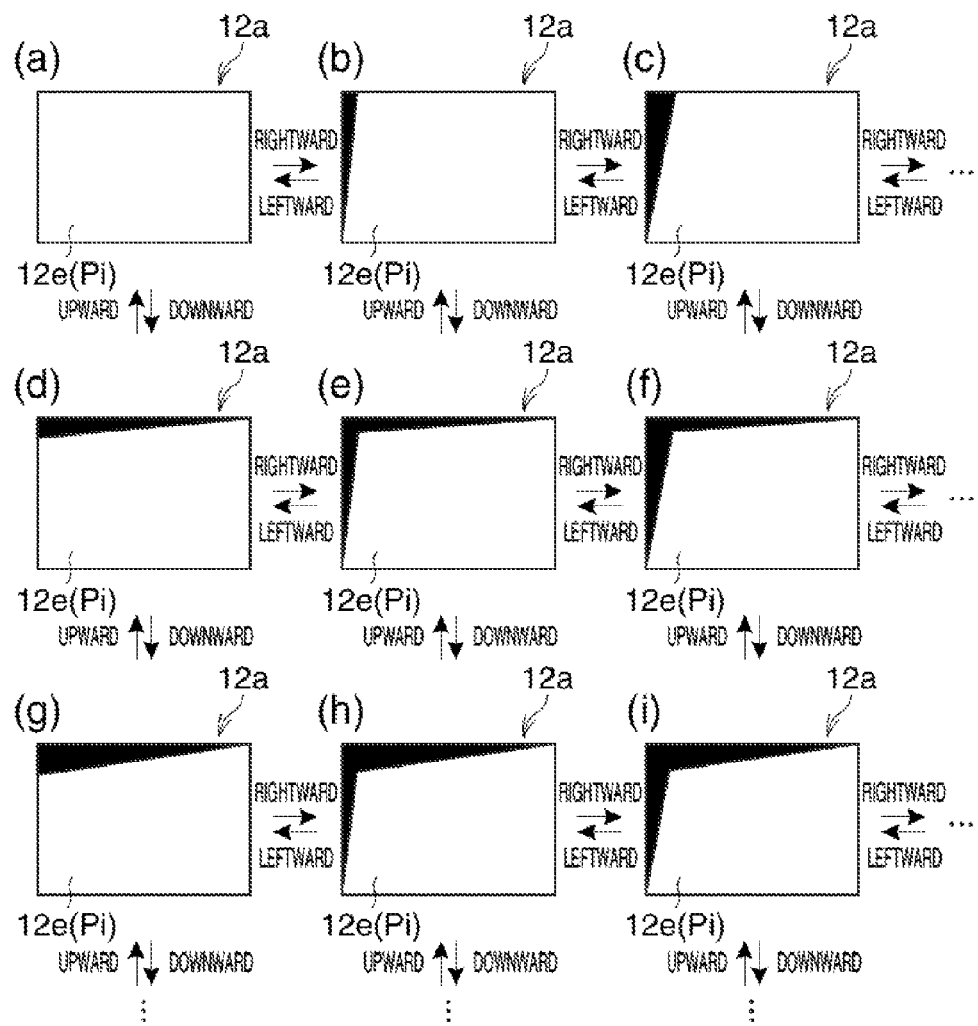
FIGS. 14A to 14I describe a procedure of correcting trapezoidal distortion and are front views of the projection surface.

Further, since each of the corners of an image formation region 12e is unable to move out of the pixel region 12a, when any of the corners is located on the outer edge (boundary) of the pixel region 12a, that is, reaches the limit of the movable range, the control unit 20 ignores operation of the direction key that moves the corner out of the pixel region 12a. Further, when any of the corners is located on the outer edge of the pixel region 12a, the control unit 20 notifies the user that the corner is unable to move outward by instructing the OSD processing unit 32 to change the color of the direction mark E that causes the corner to move out of the pixel region 12a, that is, the direction mark E pointing in the direction in which the corner is unable to move to a color less visible (gray or any other dark color, for example) than the color of the direction marks E pointing in the other directions (orange or any other bright color, for example). For example, when a corner to be moved is located at the upper end of the pixel region 12a as shown in FIGS. 14A, 14B, and 14C, the upward direction mark E is displayed in the less visible color, and when the upward direction key is operated, the operation is ignored. When a corner to be moved is located at the left end of the pixel region 12a as shown in FIGS. 14A, 14D, and 14G, the leftward direction mark E is displayed in the less visible color, and when the leftward direction key is operated, the operation is ignored. The reason why the control unit 20 returns to step S210 after step S212 and newly displays the corner adjustment image Pz again is to update the colors of the direction marks E in accordance with the situations. The limit of the movable range is not necessarily the outer edge of the pixel region 12a but may be set arbitrarily within the pixel region 12a.

In step S213 in FIG. 11, the control unit 20 determines whether or not the enter key or the cancel key has been operated. When no enter key or cancel key has been operated, the control unit 20 returns to step S211. On the other hand, when the enter key or the cancel key has been operated, the control unit 20 completes moving the selected corner and returns to step S204, where the control unit 20 restores the state in which the corner selection image Ps is displayed. The user may then select any of the other corners to continue the adjustment or operate the cancel key to terminate the procedure.

The image correction unit 33 then deforms the projected image Ao on the projection surface S by producing deformed image formation region 12e on each of the liquid crystal light valves 12 as illustrated in FIGS. 14A to 14I and forming an input image Pi in the image formation region 12e. The trapezoidal distortion, for example, that shown in FIGS. 9A to 9D, is thus corrected. In the operation described above, the image correction unit 33 functions as a correction unit, and the operation thereof corresponds to the correction step. The projector 2 can thus display the corner selection image Ps and the corner adjustment image Pz in accordance with the operation of the trapezoidal distortion correction key, the direction keys, the enter key, and the cancel key for trapezoidal distortion correction.

Figure 12:
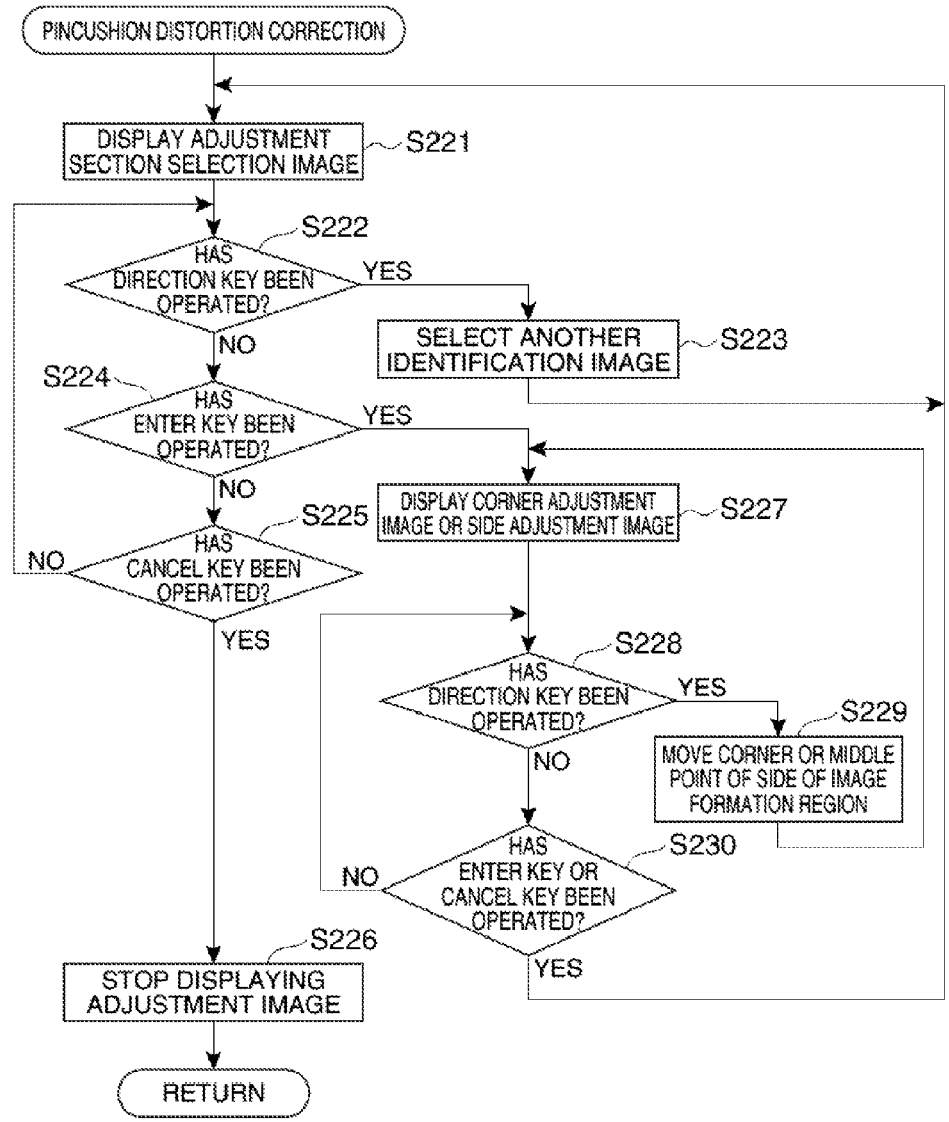
FIG. 12 is a flowchart for describing the operation of the projector when the pincushion distortion correction key is operated.

FIG. 12 is a detailed flowchart showing the pincushion distortion correction carried out in step S202 (FIG. 11).

When the user instructs to make pincushion distortion correction, the control unit 20 instructs the OSD processing unit 32 in step S221 to display an input image Pi with an adjustment section selection image Pu overlaid thereon.

Figure 15:
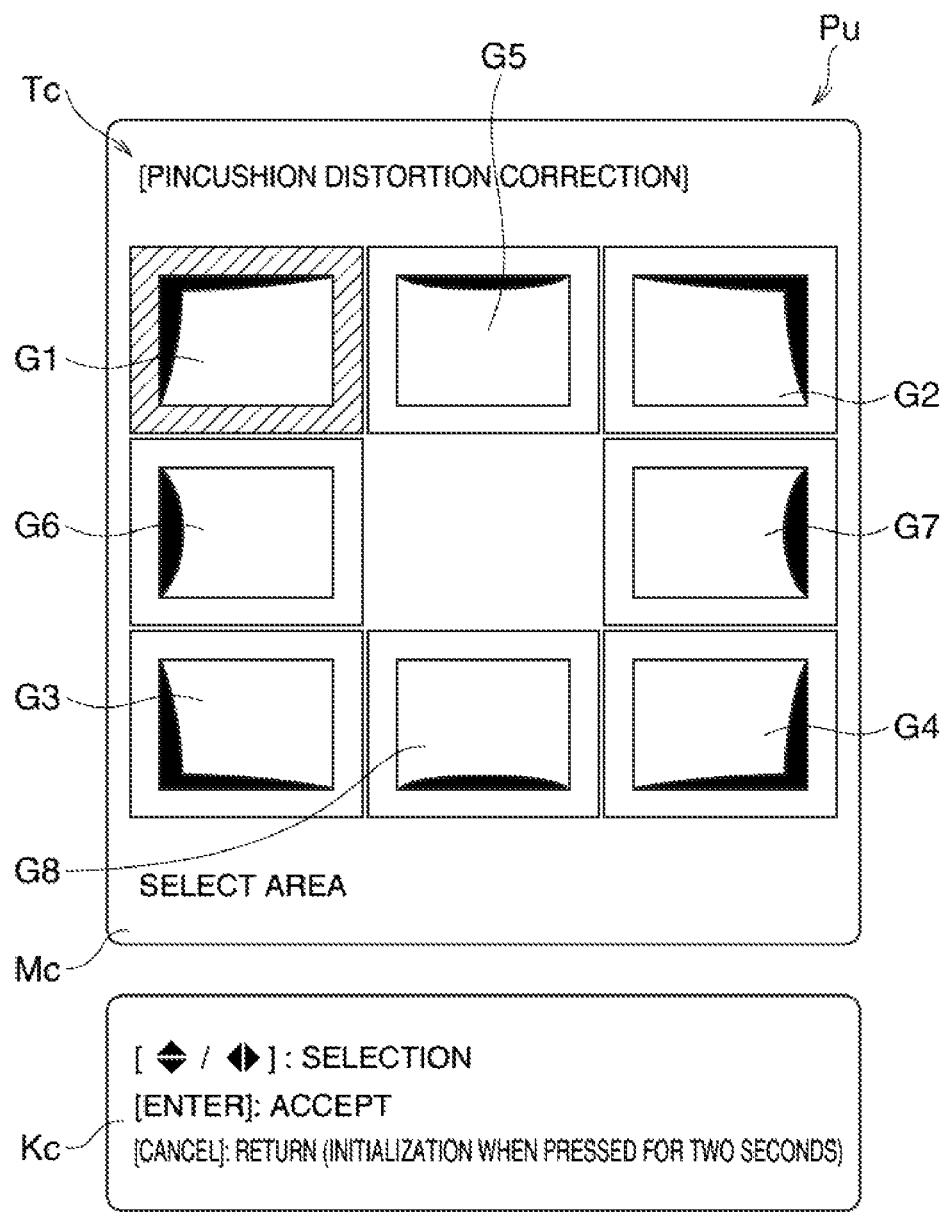
FIG. 15 shows an adjustment section selection image.
Figure 16:
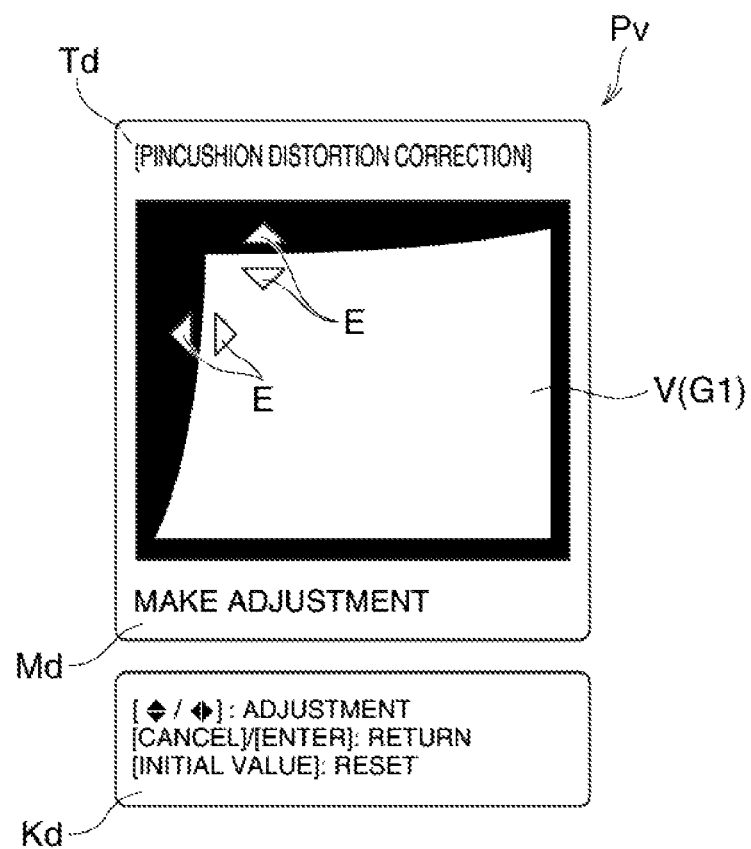
FIG. 16 shows a corner adjustment image.
Figure 17:
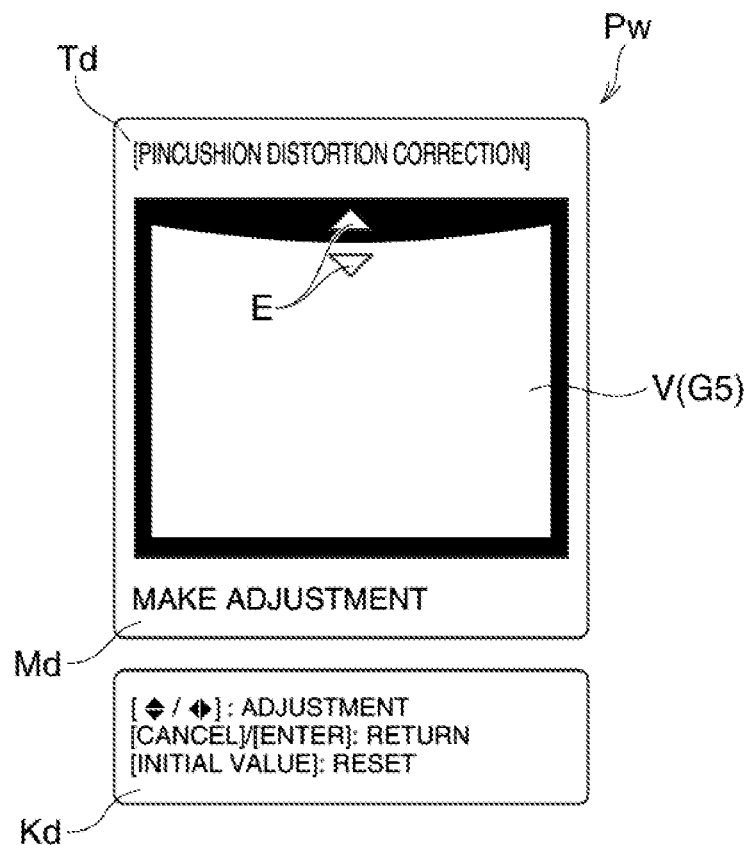
FIG. 17 shows a side adjustment image.

FIGS. 15 to 17 show images displayed when the pincushion distortion correction is in progress. FIG. 15 shows the adjustment section selection image Pu. FIG. 16 shows a corner adjustment image Pv. FIG. 17 shows a side adjustment image Pw.

The adjustment section selection image Pu has a title section Tc, four identification images G1 to G4 corresponding to the four corners of an input image Pi, that is, the four corners of an image formation region 12e, four identification images G5 to G8 corresponding to the four sides of the image formation region 12e, a message section Mc where a message for the user is displayed, and a key guide section Kc that guides the user to operable operation keys and the operation thereof.

The identification images G1 to G8 are formed of an identification image G1 corresponding to the upper left corner of the image formation region 12e (input image Pi), an identification image G2 corresponding to the upper right corner, an identification image G3 corresponding to the lower left corner, an identification image G4 corresponding to the lower right corner, G5 corresponding to the upper side, G6 corresponding to the left side, G7 corresponding to the right side, and G8 corresponding to the lower side, and they all have the same size. The identification images G1 to G8 are arranged in a matrix formed of three rows by three columns and having a central space and disposed in the matrix in the corresponding positions in the image formation region 12e. For example, the identification image G1 corresponding to the upper left corner is disposed in an upper left portion of the matrix. Each of the identification images G1 to G8 has an illustration representing the corresponding corner or side drawn therein, whereby the user can intuitively understand the relationship between the corners and sides of the image formation region 12e and the identification images G1 to G8.

The title section Tc displays "Pincushion distortion correction," which clearly shows the user that the function intends to correct pincushion distortion, and the message section Mc displays "Select area," prompting the user to select one of the corners and the sides by selecting one of the identification images G1 to G8. The selected one (identification image G1 in the example shown in FIG. 15) of the identification images G1 to G8 is surrounded by a frame colored differently from those surrounding the other seven, which shows that the identification image G surrounded by the differently colored frame has been selected. In the following sections, the color for an identification image G that has been selected is also called a "selected state color," and the color for identification images G that have not been selected is also called an "unselected state color." The user can select a desired identification image G by operating the direction keys, and the selection of an identification image G is accepted by operating the enter key after the identification image G is selected.

The corner adjustment image Pv has a title section Td, an enlarged image display section V, a message section Md where a message for the user is displayed, and a key guide section Kd that guides the user to operable operation keys and the operation thereof, as shown in FIG. 16. The title section Td displays "Pincushion distortion correction," as the title section Tc in the adjustment section selection image Pu does.

The corner adjustment image Pv is displayed when any of the identification images G1 to G4 corresponding to the corners is selected in the adjustment section selection image Pu shown in FIG. 15.

The enlarged image display section V displays an enlarged identification image G (identification image G1 in the example shown in FIG. 16) selected in the adjustment section selection image Pu but does not display the unselected three identification images G (identification images G2 to G4 in the example shown in FIG. 16). The enlarged image display section V also has additional triangular direction marks E pointing upward, downward, rightward, and leftward, which indicate that the corner corresponding to the enlarged identification image G can be movable upward, downward, rightward, and leftward (position is adjustable). The message section Md displays "Make adjustment," prompting the user to adjust the position of the corner. In the state in which the corner adjustment image Pv is displayed, the user can adjust the position of the corner by operating the direction keys.

In the adjustment section selection image Pu (FIG. 15), when any of the identification images G5 to G8 corresponding to the sides is selected, the side adjustment image Pw shown in FIG. 17 is displayed instead of the corner adjustment image Pv. The side adjustment image Pw has a title section Td, an enlarged image display section V, a message section Md where a message for the user is displayed, and a key guide section Kd that guides the user to operable operation keys and the operation thereof, which are the same as those in the corner adjustment image Pv, and the enlarged image display section V displays an enlarged identification image G (identification image G5 in the example shown in FIG. 17) that corresponds to any of the sides of the image formation region 12e and has been selected in the adjustment section selection image Pu. In the side adjustment image Pw, the identification images G corresponding to the three sides that have not been selected (G6 to G8 in the example shown in FIG. 17) are not displayed.

The enlarged image display section V also has additional triangular direction marks E pointing upward, downward, rightward, and leftward, as the corner adjustment image Pv does. However, since the sides of the image formation region 12e are adjustable only in the upward and downward directions or the rightward and leftward directions, two direction marks E pointing in two directions are added to the side adjustment image Pw. When either of the identification images G5 and G8 corresponding to the upper and lower sides is selected, two direction marks E pointing upward and downward are added to the side adjustment image Pw, whereas when either of the identification images G6 and G7 corresponding to the left and right sides is selected, two direction marks E pointing leftward and rightward are added to the side adjustment image Pw.

The direction marks E indicate that a side corresponding to an enlarged identification image G is movable upward and downward or leftward and rightward (position is adjustable).

FIGS. 18A to 18I, 19A to 19C, and 20A to 20C show how an image formation region 12e is deformed in accordance with operation performed in the corner adjustment image Pv and the side adjustment image Pw. FIGS. 18A to 18I describe movement of a corner of the image formation region 12e. FIGS. 19A to 19C and 20A to 20C each describe movement of a middle point of a side of the image formation region 12e. FIGS. 18A to 18I, 19A to 19C, and 20A to 20C each show the pixel region 12a of one of the liquid crystal light valves 12.

Figure 18:
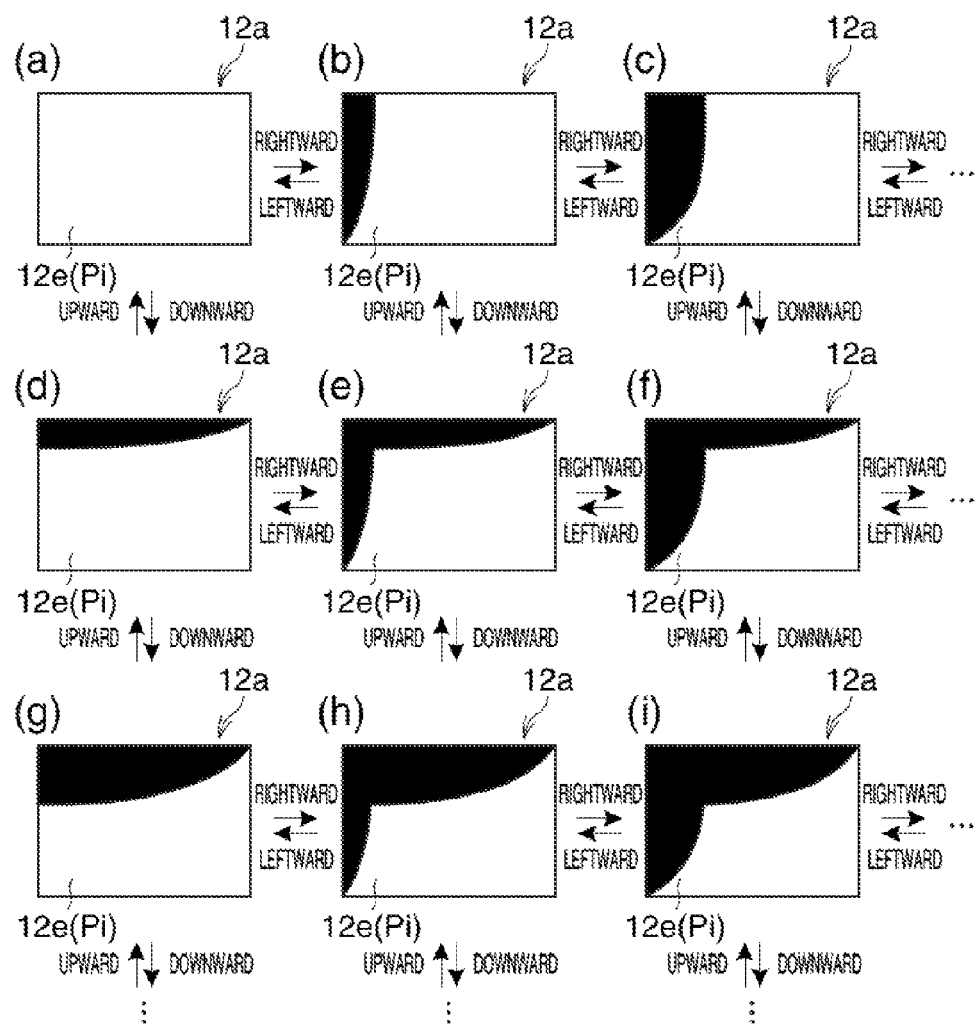
FIGS. 18A to 18I describe movement of a corner of an image formation region and show the pixel region of the liquid crystal light valve.

FIGS. 18A to 18I show examples of operation on the identification image G1 corresponding to the upper left corner of the image formation region 12e. When any of the direction keys is operated in the state in which the corner adjustment image Pv is displayed, the image formation region 12e is so deformed that the corner corresponding to the identification image G displayed in the enlarged image display section V is moved upward, downward, rightward, or leftward in accordance with the operation, as shown in FIGS. 18A to 18I. For example, when the upward direction key is operated in the state shown in FIG. 18E, the corner of the image formation region 12e is moved to a position one step upward. In accordance with the movement of the corner, the sides connected to the corner, that is, the curves that form the contour of the image formation region 12e, are deformed, and the shape of the image formation region 12e is changed as shown in FIG. 18B. The change in the curves in accordance with the movement of the corner is computed in accordance with an algorithm set in advance by the control unit 20. On the other hand, when the downward direction key is operated in the state shown in FIG. 18E, the corner of the image formation region 12e is moved to a position one step downward and the image formation region 12e is deformed as shown in FIG. 18H. Similarly, when the rightward direction key is operated, the image formation region 12e is deformed as shown in FIG. 18F, whereas when the leftward direction key is operated, the image formation region 12e is deformed as shown in FIG. 18D. As described above, the image formation region 12e can be deformed by operating the direction marks E for distortion correction.

Further, since each of the corners of the image formation region 12e is unable to move out of the pixel region 12a, when any of the corners is located on the outer edge (boundary) of the image formation region 12e, that is, reaches the limit of the movable range, the control unit 20 ignores operation of the direction key that moves the corner out of the pixel region 12a. Further, when any of the corners is located on the outer edge of the pixel region 12a, the control unit 20 notifies the user that the corner is unable to move outward by instructing the OSD processing unit 32 to change the color of the direction mark E that causes the corner to move out of the pixel region 12a, that is, the direction mark E pointing in the direction in which the corner is unable to move to a color less visible (gray or any other dark color, for example) than the color of the direction marks E pointing in the other directions (orange or any other bright color, for example). For example, when a corner to be moved is located at the upper end of the pixel region 12a as shown in FIGS. 18A, 18B, and 18C, the upward direction mark E is displayed in the less visible color, and when the upward direction key is operated, the operation is ignored. When a corner to be moved is located at the left end of the pixel region 12a as shown in FIGS. 18A, 18D, and 18G, the leftward direction mark E is displayed in the less visible color, and when the leftward direction key is operated, the operation is ignored.

The identification image G1 illustrated in FIGS. 18A to 18I shows a case where each side of the image formation region 12e is deformed to be inwardly convex. When pincushion distortion occurs, however, each side of a projected image Ao may be outwardly or inwardly convex with respect to the normal projected image Ao, as shown in FIGS. 10A to 10H. In view of the fact described above, for example, when the upper side of the image formation region 12e is moved further upward from the state shown in FIG. 18B, the operation does not need to be terminated because the upper side has reached the limit and is unable to go further, but the user may, for example, be guided to operation of reducing the size of the image formation region 12e in the pixel region 12a. Alternatively, the user may be guided to operation of shifting the image formation region 12e in the pixel region 12a away from the side that has reached the end of the pixel region 12a. Still alternatively, the control unit 20 may not only guide the user to the operation described above but also may actually reduce the size of the image formation region 12e or shift the image formation region 12e. In this case, the range within which the pincushion distortion correction can be performed on the projected image Ao on the projection surface S is enlarged.

Figure 19:
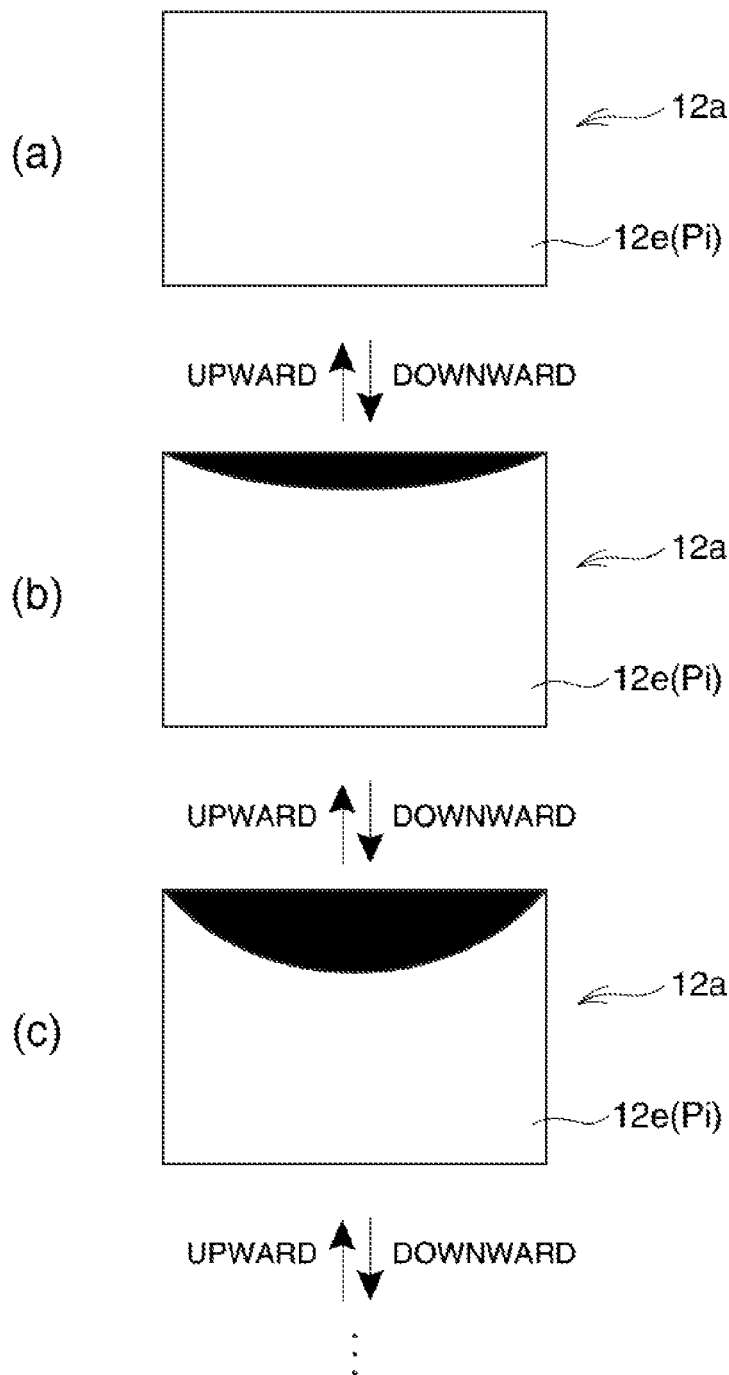
FIGS. 19A to 19C describe movement of the middle point of a horizontal side of an image formation region and show the pixel region of the liquid crystal light valve.

FIGS. 19A to 19C describe movement of the middle point of a horizontal side of an image formation region 12e and show operation on the identification image G5 corresponding to the upper side of the image formation region 12e as an example. When any of the direction keys is operated in the state in which the side adjustment image Pw is displayed, the image formation region 12e is so deformed that the side corresponding to the identification image G displayed in the enlarged image display section V is moved upward or downward in accordance with the operation, as shown in FIGS. 19A to 19C. In this process, the entire side is not translated, but the middle point of the side is moved upward or downward and the side is deformed in accordance with the movement of the middle point. The change in the side is determined by computationally drawing a curve that passes through the moved middle point in accordance with an algorithm set in advance by the control unit 20. For example, when the upward direction key is operated in the state shown in FIG. 19B, the center of the side of the image formation region 12e is moved to a position one step upward. In accordance with the movement, the side, that is, the curve that forms the contour of the image formation region 12e is deformed as shown in FIG. 19A. On the other hand, when the downward direction key is operated in the state shown in FIG. 19B, the center of the side of the image formation region 12e is moved to a position one step downward and the image formation region 12e is deformed as shown in FIG. 19C. In this process, the control unit 20 moves the center of the side as a predetermined point, but a point in another position may alternatively be moved. It is, however, noted that since an image formation region 12e typically has a rectangular shape, moving the center of a side is preferable for pincushion distortion correction.

Figure 20:
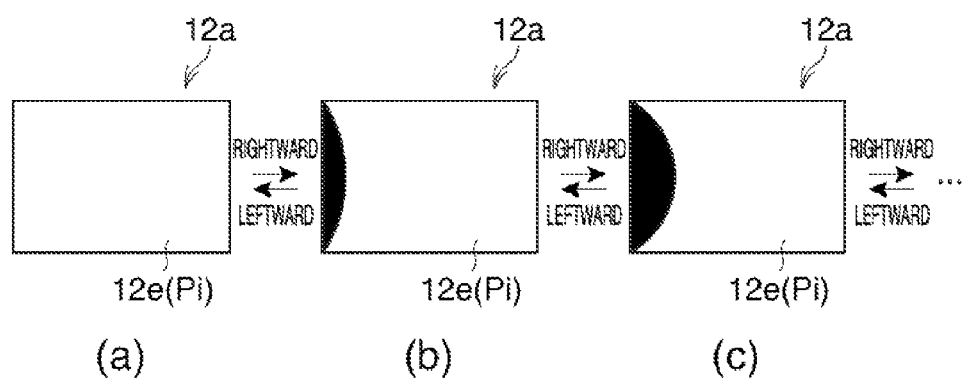
FIGS. 20A to 20C describe movement of the middle point of a vertical side of an image formation region and show the pixel region of the liquid crystal light valve.

FIGS. 20A to 20C describe movement of the middle point of a vertical side of an image formation region 12e and show operation on the identification image G6 corresponding to the left side of the image formation region 12e as an example. When any of the direction keys is operated in the state in which the side adjustment image Pw is displayed, the image formation region 12e is so deformed that the side corresponding to the identification image G displayed in the enlarged image display section V is moved leftward or rightward in accordance with the operation, as shown in FIGS. 20A to 20C. In accordance with the operation of the direction mark E, the entire side is not translated, but the middle point of the side is moved rightward or leftward and the side is deformed in accordance with the movement of the middle point, as in the case described with reference to FIGS. 19A to 19C. The change in the side is determined by computationally drawing a curve that passes through the moved middle point in accordance with an algorithm set in advance by the control unit 20.

For example, when the leftward direction key is operated in the state shown in FIG. 20B, the center of the side of the image formation region 12e is moved to a position one step leftward. In accordance with the movement, the side, that is, the curve that forms the contour of the image formation region 12e is deformed as shown in FIG. 20A. On the other hand, when the rightward direction key is operated in the state shown in FIG. 20B, the center of the side of the image formation region 12e is moved to a position one step rightward and the image formation region 12e is deformed as shown in FIG. 20C.

In step S222 in FIG. 12, the control unit 20 determines whether or not the user has operated any of the direction keys. When no direction key has been operated, the control unit 20 proceeds to step S224, whereas when any of the direction keys has been operated, the control unit 20 proceeds to step S223.

In step S223, the control unit 20 newly selects one of the other identification images G that is located in the direction specified by the operated direction key, and the control unit 20 returns to step S221. At this point, in the adjustment section selection image Pu, the newly selected identification image G is displayed in the selected state color, whereas the previously selected identification image G is displayed in the unselected state color.

In step S224, the control unit 20 determines whether or not the user has operated the enter key. When the enter key has not been operated, the control unit 20 proceeds to step S225, whereas when the enter key has been operated, the control unit 20 proceeds to step S227.

In step S225, the control unit 20 determines whether or not the user has operated the cancel key. When the cancel key has not been operated, the control unit 20 returns to step S222, whereas when the cancel key has been operated, the control unit 20 proceeds to step S226.

In step S226, the control unit 20 instructs the OSD processing unit 32 to terminate the overlay display of the adjustment section selection image Pu and terminates the procedure.

In step S227, the control unit 20 instructs the OSD processing unit 32 to overlay the corner adjustment image Pv or the side adjustment image Pw instead of the adjustment section selection image Pu and display the resultant image. Which is displayed, the corner adjustment image Pv or the side adjustment image Pw, is determined by the control unit 20 in accordance with the operation in step S222.

The control unit 20 subsequently determines whether or not any of the direction keys has been operated in step S228. When any of the direction keys has been operated, the control unit 20 proceeds to step S229, whereas when no direction key has been operated, the control unit 20 proceeds to step S230.

In step S229, the control unit 20 instructs the image correction unit 33 to move the corner or the side enlarged and displayed in the corner adjustment image Pv or the side adjustment image Pw in the direction specified by the operated direction key, and the control unit 20 returns to step S227. The image correction unit 33 moves the corner or the center of the side of the image formation region 12e by a predetermined amount in the direction specified by the operated direction key, as described with reference to FIGS. 18A to 18I, 19A to 19C, and 20A to 20C. Thereafter, the image correction unit 33 corrects the image information in such a way that the input image Pi is formed in the image formation region 12e newly shaped by moving the corner or the center of the side. When the user repeatedly operates any of the direction keys or presses any of the direction keys for a long time, steps S228 and S229 are repeatedly carried out, whereby the selected corner or side can be moved by a necessary amount.

It is noted that the upward, downward, rightward, and leftward directions of a projected input image Pi do not necessarily agree with the upward, downward, rightward, and leftward directions of the liquid crystal light valves 12. In this case, a corner of an image formation region 12e is so moved that a corner of the projected input image Pi is moved in the direction according to user's operation.

The reason why the control unit 20 returns to step S227 after step S229 and newly displays the corner adjustment image Pv again is to update the colors of the direction marks E in accordance with the situations. Further, the limit of the movable range of a corner or a side is not necessarily the outer edge of the pixel region 12a but may be set arbitrarily within the pixel region 12a.

In step S230, the control unit 20 determines whether or not the enter key or the cancel key has been operated. When no enter key or cancel key has been operated, the control unit 20 returns to step S228. On the other hand, when the enter key or the cancel key has been operated, the control unit 20 completes moving the selected corner and returns to step S221, where the control unit 20 restores the state in which the adjustment section selection image Pu is displayed. The user may then select any of the other corners to continue the adjustment or operate the cancel key to terminate the procedure.

A description will next be made of a specific procedure of correcting the pincushion distortion shown in FIGS. 10A to 10H in accordance with the flowchart described above.

Figure 21A:
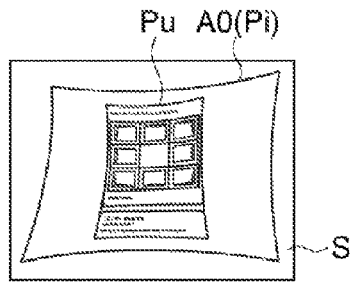
FIGS. 21A to 21G describe a procedure of correcting pincushion distortion and are front views showing the projection surface.
Figure 21B:
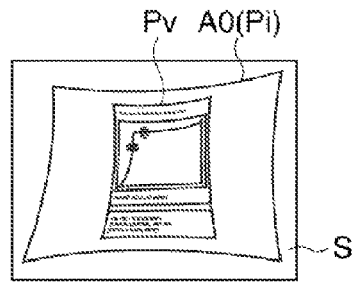
Figure 21C:
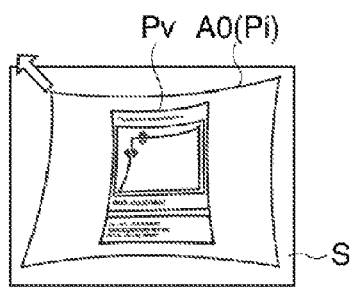
Figure 21D:
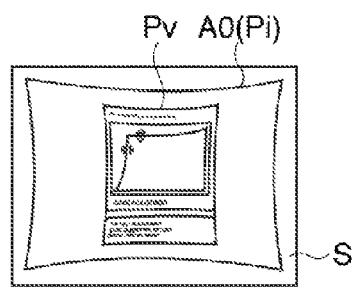
Figure 21E:
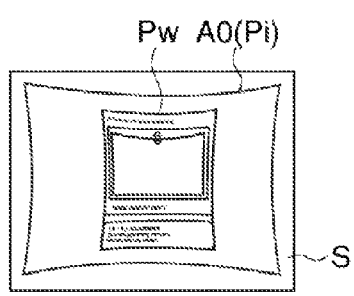
Figure 21F:
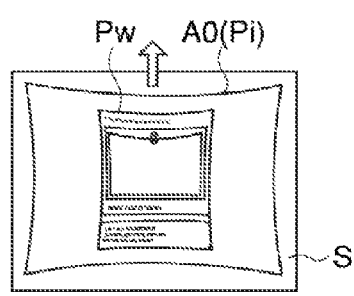
Figure 21G:
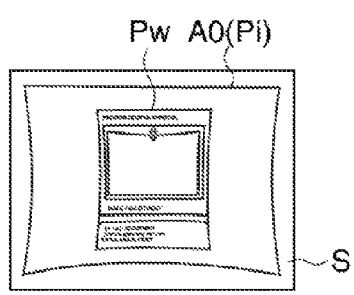
Figure 22A:
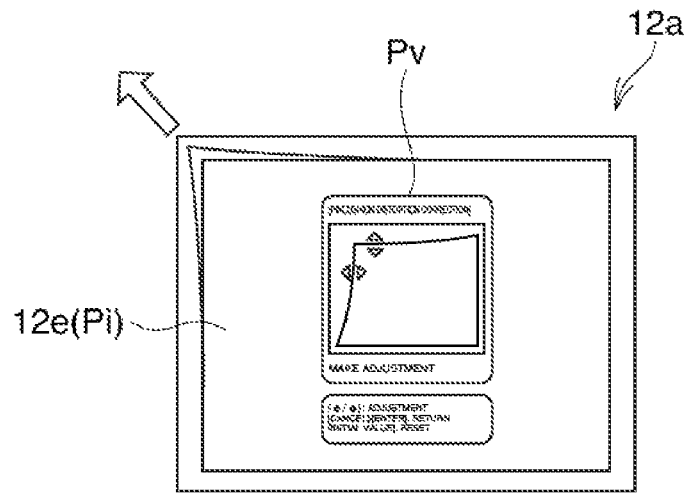
FIGS. 22A and 22B describe the procedure of correcting pincushion distortion and show the pixel region of the liquid crystal light valve.
Figure 22B:
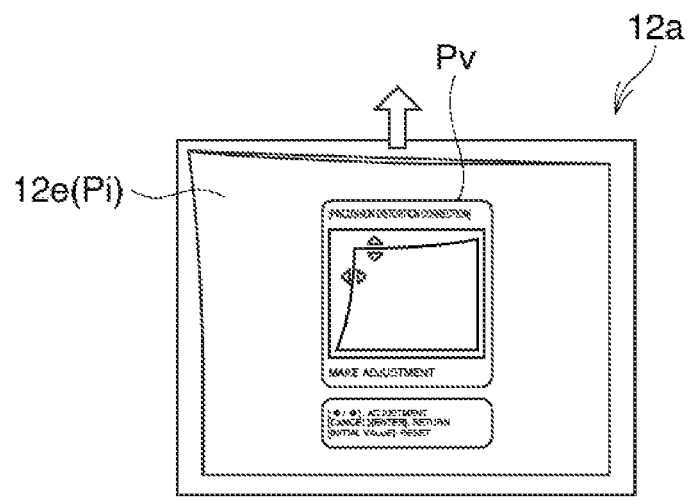

FIGS. 21A to 21G and FIGS. 22A and 22B describe the procedure of correcting the pincushion distortion. FIGS. 21A to 21G are front views showing the projection surface S, and FIGS. 22A and 22B show the pixel region 12a of one of the liquid crystal light valves 12.

In the state in which an input image Pi projected on the projection surface S is accompanied by pincushion distortion, when the user operates the pincushion distortion correction key, the control unit 20 starts the operation according to the flowchart shown in FIG. 12, first overlays the adjustment section selection image Pu on the input image Pi, and displays the resultant image (step S221), as shown in FIG. 21A.

The user operates the direction keys as required (step S222) and first selects the identification image G1 corresponding to the upper left corner (step S223). When the user then operates the enter key (step S224), the control unit 20 displays the input image Pi with the corner adjustment image Pv overlaid thereon (step S227) and enlarges and displays the identification image G1 in the enlarged image display section V of the corner adjustment image Pv, as shown in FIG. 21B.

When the corner adjustment image Pv is displayed, the user, who can move the corner of the image formation region 12e (input image Pi) by operating the direction keys, operates the leftward key and the upward key as appropriate to move the selected upper left corner leftward and upward (step S228). The upper left corner of the image formation region 12e is moved leftward by a predetermined amount whenever the leftward key is operated and upward by a predetermined amount whenever the upward key is operated (step S229), as shown in FIGS. 18A to 18I. Looking at the input image Pi projected on the projection surface S (see FIG. 21C), the user thus moves the upper left corner of the image formation region 12e leftward and upward by a necessary amount (see FIG. 21D). As a result, the image formation region 12e formed on the liquid crystal light valves 12 is so deformed that the upper left corner is moved leftward and upward as shown in FIG. 22A. When the user then operates the enter key or the cancel key (step S230), the control unit 20 completes moving the upper left corner and returns to the state in which the adjustment section selection image Pu is displayed (step S221).

The user then operates the direction keys as required (step S222) and now selects the identification image G5 corresponding to the upper side (step S223). When the user operates the enter key (step S224), the control unit 20 displays the input image Pi with the side adjustment image Pw overlaid thereon (step S227) and enlarges and displays the identification image G5 in the enlarged image display section V of the side adjustment image Pw, as shown in FIG. 21E.

When the side adjustment image Pw is displayed, the user operates the upward key as appropriate (step S228) while looking at the input image Pi projected on the projection surface S (see FIG. 21F) to move the upper side of the image formation region 12e by a necessary amount. As a result, the image formation region 12e formed on the liquid crystal light valves 12 is so deformed that the upper side is moved upward as shown in FIG. 22B. When the user operates the enter key or the cancel key (step S230), the control unit 20 completes moving the upper side and returns to the state in which the adjustment section selection image Pu is displayed (step S221). When the user then operates the cancel key (step S225), the overlay display of the adjustment section selection image Pu is terminated (step S226), and the input image Pi is displayed with the pincushion distortion eliminated.

The projector 2 can thus display the adjustment section selection image Pu, the corner adjustment image Pv, and the side adjustment image Pw in accordance with operation of the pincushion distortion correction key, the direction keys, the enter key, and the cancel key to correct pincushion distortion.

As described above, the projector 2 according to the present embodiment includes the light source apparatus 11, the liquid crystal light valves 12 that modulate light outputted from the light source apparatus 11, and the projection system including the projection lens 13 that projects image light modulated by the liquid crystal light valves 12. The control unit 20 instructs the OSD processing unit 32 to display the eight identification images G1 to G8 corresponding to the four corners of a projected image Ao carried by the image light and the four sides between the corners by projecting the image light through the projection system. The input operation unit 42 receives operation of selecting one of the thus displayed eight identification images G1 to G8, and the identification image G selected by the operation is so displayed that the selected identification image G is distinguishable from the other identification images G. In the state in which the selected identification image G is displayed, the input operation unit 42 receives operation of moving a corner or a predetermined point on a side. Based on the received operation, the image correction unit 33 moves the corner or the predetermined point on the side corresponding to the selected identification image G and corrects pincushion distortion based on the movement. Pincushion distortion can therefore be readily corrected by displaying the eight identification images G1 to G8 corresponding to the four corners and the four sides of a projected image Ao projected on the projection surface S, selecting one of the identification images G1 to G8 and displaying the selected identification image G, and correcting pincushion distortion based on operation on the identification image G.

Further, the control unit 20 adds the direction marks E movable by using the input operation unit 42 and corresponding to at least two axes to an identification image G selected by using the input operation unit 42 from the identification images G1 to G4 corresponding to the corners, whereas adding the direction mark E movable by using the input operation unit 42 and corresponding to one axis to an identification image G selected by using the input operation unit 42 from the identification images G5 to G8 corresponding to the sides. Since the optimum direction marks E are thus added to the corners and sides and displayed, the user can be guided to appropriate operation, whereby the operation of correcting pincushion distortion can be more readily carried out.

Further, the projector 2 can switch its operation mode between the pincushion distortion correction mode, in which pincushion distortion is corrected, and the trapezoidal distortion correction mode, in which trapezoidal distortion is corrected. In the trapezoidal distortion correction mode, the control unit 20 displays the four identification images C1 to C4 corresponding to the four corners of an image, and the input operation unit 42 receives operation of selecting one of the four identification images C1 to C4 displayed by the control unit 20. In the state in which the control unit 20 displays the selected identification image C, the input operation unit 42 receives operation of moving the corner corresponding to the selected identification image C, and the image correction unit 33 moves the corner based on the operation received by the input operation unit 42 and corrects trapezoidal distortion based on the movement, whereby operation of correcting trapezoidal distortion can be readily carried out as well as operation of correcting pincushion distortion.

Further, since the control unit 20 disables display of the other seven identification images G that have not been selected by using the input operation unit 42 in the pincushion distortion correction mode, whereas disabling display of the other three identification images C that have not been selected by using the input operation unit 42 in the trapezoidal distortion correction mode, the operation of correcting pincushion distortion and trapezoidal distortion can be more readily carried out under optimum display.

In the state in which a corner or a predetermined point on a side selected by the input operation unit 42 is located at the limit of the movable range and hence unable to move in a predetermined direction, the control unit 20 reduces the visibility of the direction mark E corresponding to the predetermined direction, whereby the state of the displayed direction mark E notifies the user of the limit of the operation of moving the corner or the side, and the operation of correcting pincushion distortion can be more readily carried out.

The second embodiment is presented only by way of example of a specific aspect to which the invention is applied as the first embodiment is, and the invention can also be implemented in an aspect different from the embodiments described above.

For example, in the second embodiment, an identification image C selected in the corner selection image Ps is displayed in the corner adjustment image Pz and an identification image G corresponding to a corner or a side selected in the adjustment section selection image Pu is displayed in the corner adjustment image Pv or the side adjustment image Pw. That is, the other identification images C or G that have not been selected are not displayed. Alternatively, for example, part or the entire of the identification images C and G that have not been selected, as long as they are smaller than the identification images C and G that have been selected, may be displayed in the corner adjustment image Pz, the corner adjustment image Pv, and the side adjustment image Pw. Further, in the corner adjustment image Pz, the corner adjustment image Pv, and the side adjustment image Pw, the identification images C and G that have been selected are not necessarily enlarged, and the identification images C and G that have not been selected only need to be reduced in size or only do not need to be displayed. As described above, in the corner adjustment image Pz, the corner adjustment image Pv, and the side adjustment image Pw, the identification images C and G that have been selected only need to be enhanced by a greater amount before displayed than the identification images C and G that have not been selected.

Further, in the second embodiment, in the corner adjustment image Pz, the corner adjustment image Pv, and the side adjustment image Pw, the visibility of the color of the direction mark E pointing in a direction in which a corner or a side is unable to move is lowered, and when the direction key pointing in the unmovable direction is operated, the operation is ignored. Alternatively, when the direction key pointing in the unmovable direction is operated, a message notifying that a corner or a side is unable to move may be displayed, for example, in the message sections Mb and Md.

Further, in the second embodiment, the convenience of the user is improved if the user is readily notified of the position adjustment status. To this end, the user may be allowed to identify by looking at the adjustment section selection image Pu whether or not the adjustment of the position of a corner or a side has been completed. For example, when movement of a corner or a side (position adjustment) is completed, an adjustment completion mark representing that the position adjustment has been completed may be added to an identification image G in the adjustment section selection image Pu. Alternatively, the color of an identification image G having undergone position adjustment may be changed.

Further, in the second embodiment, when any of the direction keys is operated in the state in which the corner adjustment image Pv or the side adjustment image Pw is displayed, the color of the corresponding direction mark E may be temporarily changed in response to the operation. In this way, whenever a direction key is operated, the color of the corresponding direction mark E changes, whereby the user can recognize that operation of the direction key is normally received.

In the first embodiment, a description has been made of the projector 1 having a function of performing bow-shape correction (curved distortion correction), and in the second embodiment, a description has been made of the projector 2 that corrects trapezoidal distortion and distortion called pincushion distortion, barrel distortion, or otherwise named. A projector having all the functions described above can, of course, be provided. That is, a projector to which the invention is applied can be configured to perform the bow-shape correction, the trapezoidal distortion correction, and the pincushion distortion correction on an image projected on the projection surface S.

In the first and second embodiments, the description has been made with reference to the projector 2, which is of three-panel type in which the three liquid crystal light valves 12R, 12G, and 12B are used as light modulators, but the light modulators are not limited thereto. For example, the light modulators may alternatively have any of the following forms: a combination of a single-panel transmissive or reflective liquid crystal panel and a color wheel; a three-panel digital mirror device (DMD); and a combination of a single-panel digital mirror device (DMD) and a color wheel. When only a single liquid crystal panel or DMD is used as the display unit, a member corresponding to a cross-dichroic prism or any other combining system is not required. Further, each light modulator is not limited to a liquid crystal panel or a DMD, and any component capable of modulating light emitted from a light source can be used without any problem. Moreover, the light source apparatus 11, which is formed of the discharge-type light source lamp 11a, can alternatively be formed of an LED light source or any other solid-state light source or any other suitable light source.

Each functional unit of the projector 1 shown in FIG. 1 and each functional unit of the projector 2 shown in FIG. 7 represent functional configurations achieved by cooperation between hardware and software and are not limited to specific implementations. It is therefore not necessary to implement hardware corresponding to each functional unit, but a single processor that executes a program can, of course, serve as a plurality of functional units. Further, in the embodiments described above, part of the functions achieved by software may be achieved by hardware, or part of the functions achieved by hardware may be achieved by software. Additionally, the specific detailed configuration of each of the other units of the projector 2 can be arbitrarily changed to the extent that the change does not depart from the substance of the invention.

What is claimed is:

1. A projector that projects an image based on image information, the projector comprising:
   an operation reception unit that receives input operation;
   a selection unit that allows selection of one of a plurality of controlled objects located in correspondence with vertices of a contour of the image based on the image information and sides of the contour; and
   a correction unit that allows movement of the controlled object selected by using the selection unit within the image based on the input operation and corrects the contour of the image based on the moved controlled object,
   wherein the selection unit is a control point selection unit that handles the vertices and predetermined points located on the sides of the contour as control points that are the controlled objects and allows selection of one of the plurality of control points as a selected control point, and
   the correction unit includes
      a control point movement unit that allows movement of the selected control point selected by using the control point selection unit within the image based on the input operation, and
      an image correction unit that forms a contour of the image in such a way that the contour passes through the selected control point moved by using the control point movement unit and corrects the image information to fit in the formed contour.

2. The projector according to claim 1, wherein the image correction unit forms the contour of the image in such a way that the selected control point is connected to an adjacent one of the control points with a curve.

3. The projector according to claim 1,
   wherein each of the predetermined points is at least one point located on the corresponding side of the contour.

4. The projector according to claim 3,
   wherein a default position of each of the predetermined points is the center of the corresponding side of the contour.

5. The projector according to claim 4,
   wherein each of the predetermined points is movable based on the input operation along a line connecting the default position to the center of the image.

6. A projector that projects an image based on image information, the projector comprising:
   a light source;
   a light modulator that modulates light emitted from the light source;
   a projection system that projects image light modulated by the light modulator;
   an operation reception unit that receives input operation;
   a selection unit that allows selection of one of a plurality of controlled objects located in correspondence with vertices of a contour of the image based on the image information and sides of the contour;
   a correction unit that allows movement of the controlled object selected by using the selection unit within the image based on the input operation and corrects the contour of the image based on the moved controlled object; and
   an identification image display unit that projects the image light through the projection system to display eight identification images corresponding to four corners of the image carried by the image light and four sides between the corners,
   wherein the selection unit includes
      a selection operation unit that receives operation of selecting one of the eight identification images displayed by the identification image display unit,
      an enhancement display unit that enhances the identification image selected by the selection operation unit to be distinguishable from the other identification images and displays the enhanced identification image, and
      a movement operation unit that, in a state in which the enhancement display unit displays the enhanced identification image, receives operation of moving the controlled object located at the corner or in a predetermined position on the side, and
   the correction unit moves the corner or the predetermined position on the side corresponding to the identification image selected by the selection operation unit based on the operation received by the movement operation unit and corrects pincushion distortion based on the movement.

7. The projector according to claim 6,
   wherein the enhancement display unit adds direction marks that correspond to at least two axes and are movable by using the movement operation unit to the identification image selected by using the selection operation unit from the identification images corresponding to the corners and adds a direction mark that corresponds to one axis and is movable by using the movement operation unit to the identification image selected by using the selection operation unit from the identification images corresponding to the sides.

8. The projector according to claim 6,
   wherein the projector is configured to be capable of choosing an operation mode thereof between a pincushion distortion correction mode in which pincushion distortion is corrected and a trapezoidal distortion correction mode in which trapezoidal distortion is corrected, and
   in the trapezoidal distortion correction mode, the identification image display unit displays four identification images corresponding to the four corners of the image,
   the selection operation unit receives operation of selecting one of the four identification images displayed by the identification image display unit,
   in a state in which the enhancement display unit displays the selected identification image, the movement operation unit receives operation of moving the corner, and
   the image correction unit moves the corner corresponding to the identification image selected by using the selection operation unit based on the operation received by the movement operation unit and corrects trapezoidal distortion based on the movement.

9. The projector according to claim 8,
   wherein the enhancement display unit disables display of the other seven identification images that have not been selected by using the selection operation unit in the pincushion distortion correction mode whereas disabling display of the other three identification images that have not been selected by using the selection operation unit in the trapezoidal distortion correction mode.

10. The projector according to claim 7,
    wherein in a state in which the corner or the predetermined position on the side selected by using the selection operation unit is located at a limit of a movable range and hence unable to move in a predetermined direction, the enhancement display unit reduces visibility of the direction mark corresponding to the predetermined direction.

11. A method for controlling a projector that projects an image based on image information, the method comprising:
   selecting one of a plurality of controlled objects located in correspondence with vertices of a contour of the image based on the image information and sides of the contour;
   moving the controlled object selected in the selecting within the image based on input operation; and
   correcting the contour of the image based on the controlled object moved in the moving,
   wherein the selecting is a control point selection in which the vertices and predetermined points located on the sides of the contour are handled as control points that are the controlled objects and one of the plurality of control points is selected as a selected control point,
   in the moving, the selected control point selected in the control point selection is moved within the image based on the input operation, and
   in the correcting, a contour of the image is so formed that the contour passes through the selected control point moved in the moving and the image information is corrected to fit in the formed contour.

12. A method for controlling a projector that projects an image based on image information, the method comprising:
   selecting one of a plurality of controlled objects located in correspondence with vertices of a contour of the image based on the image information and sides of the contour;
   moving the controlled object selected in the selecting within the image based on input operation; and
   correcting the contour of the image based on the controlled object moved in the moving,
   wherein in the selecting, image light is projected through a projection system to display eight identification images corresponding to four corners of the image carried by the image light and four sides between the corners, operation of selecting one of the eight identification images is received, and the selected identification image is so enhanced and displayed that the enhanced identification image is distinguishable from the other identification images,
   in the moving, in a state in which the enhanced identification image is displayed, operation of moving the corner or a predetermined position on the side is received, and the corner or the predetermined position on the side corresponding to the identification image selected in the selecting is moved based on the received operation, and
   in the correcting, pincushion distortion is corrected based on the movement in the moving.

* * * * *